United States Patent
Royo Royo et al.

(10) Patent No.: US 10,018,724 B2
(45) Date of Patent: Jul. 10, 2018

(54) SYSTEM AND METHOD FOR SCANNING A SURFACE AND COMPUTER PROGRAM IMPLEMENTING THE METHOD

(71) Applicant: UNIVERSITAT POLITÈCNICA DE CATALUNYA, Barcelona (ES)

(72) Inventors: Santiago Royo Royo, Castellbisbal (ES); Jordi Rius Gras, Barcelona (ES)

(73) Assignee: UNIVERSITAT POLITECNICA DE CATALUNYA, Barcelona (ES)

( * ) Notice: Subject to any disclaimer, the term of this patent is extended or adjusted under 35 U.S.C. 154(b) by 0 days.

(21) Appl. No.: 14/767,579

(22) PCT Filed: Aug. 21, 2014

(86) PCT No.: PCT/ES2014/070108
§ 371 (c)(1),
(2) Date: Aug. 12, 2015

(87) PCT Pub. No.: WO2014/125153
PCT Pub. Date: Aug. 21, 2014

(65) Prior Publication Data
US 2015/0378023 A1    Dec. 31, 2015

(30) Foreign Application Priority Data
Feb. 13, 2013   (ES) .................... 201330185

(51) Int. Cl.
*G01C 3/08*      (2006.01)
*G01S 17/89*     (2006.01)
(Continued)

(52) U.S. Cl.
CPC ............ *G01S 17/89* (2013.01); *G01S 7/4817* (2013.01); *G01S 17/32* (2013.01); *G01S 17/66* (2013.01)

(58) Field of Classification Search
CPC ........ G01S 7/4817; G01S 17/89; G01S 17/66; G01S 17/32
(Continued)

(56) References Cited

U.S. PATENT DOCUMENTS

2008/0147253 A1*   6/2008   Breed .................. B60W 30/16
                                                          701/3
2011/0176146 A1    7/2011   Alvarez Diez et al.
(Continued)

FOREIGN PATENT DOCUMENTS

WO    WO2012123809 A1    9/2012
WO    WO2014125153 A1    8/2014

*Primary Examiner* — Mark Hellner
(74) *Attorney, Agent, or Firm* — Robert J. Hess; Hess Patent Law Firm

(57) ABSTRACT

A system and method for scanning a surface and a computer program implementing the method. The method is suitable for performing the functions carried out by the system of the invention. The computer program implements the method of the invention. The system
  means for illuminating illuminates different sub-areas (Si) of a surface (S) with a light beam (Be) in an alternating manner, and
  receives and detects the portions of reflected light (Br) reflected on same, including:
  one or more light detectors (D); and
  light redirection means including a determined spatial distribution model (Qr) of the light redirection elements (GM), which receive the portions of reflected light (Br) and sequentially redirect them towards the light detector or detectors (D).

20 Claims, 12 Drawing Sheets

(51) Int. Cl.
*G01S 7/481* (2006.01)
*G01S 17/32* (2006.01)
*G01S 17/66* (2006.01)

(58) Field of Classification Search
USPC .......................................................... 356/5.01
See application file for complete search history.

(56) References Cited

U.S. PATENT DOCUMENTS

2012/0050750 A1* 3/2012 Hays ..................... G01J 9/04
356/519
2012/0249999 A1 10/2012 Slettner

* cited by examiner

SYSTEM AND METHOD FOR SCANNING A SURFACE AND COMPUTER PROGRAM IMPLEMENTING THE METHOD

FIELD OF THE ART

The present invention relates generally, in a first aspect, to a system for scanning a surface, comprising means for illuminating different regions of a surface to be scanned and means for receiving and detecting the portions of light reflected on same including one or more light detectors, and more particularly to a system which allows using the total spatial resolution of the light detector or detectors for each of the regions of the surface to be scanned.

A second aspect of the invention relates to a method suitable for performing the functions carried out by the system of the first aspect.

A third aspect of the invention relates to a computer program implementing the method of the second aspect.

BACKGROUND OF THE INVENTION

TOF (acronym of "Time Of Flight"), LIDAR (acronym of "Light detection and ranging") or LADAR (acronym of "Laser detection and ranging") measurement systems are systems which allow measuring distances by means of using a light source illuminating the points being measured.

The measurable distance in TOF systems is influenced by some uncontrolled factors which depend on the environment and not on the TOF technique, such as for example, the background illumination intensity, the weather conditions (fog, dust, rain, etc.) or the reflectance of the object.

In addition, there are other aspects that depend directly on the technology and the architecture of the TOF device and play a main role in the determination of the measurable distance of each system. Among said aspects, the most significant aspects could be the illumination source power, light beam divergence, point scanning system efficiency, photodetector sensitivity, optical system attenuation or background light filtering quality.

The physical principles of TOF, LIDAR or LADAR systems state that, expressed in a very general manner, the capability of measuring a point located at a certain distance is related to the capability of illuminating it with sufficient optical power to detect the light beam reflected thereon in a light detector. This principle has a decisive influence on the measurable distance of the device and different scanning techniques have been designed based on same in order to take measurements of TOF images. There are TOF devices which can measure distances up to dozens of kilometers and others are limited to a few meters. The illuminating beam in far-reaching systems usually has little divergence. These tend to use highly collimated laser light beams with a very small divergence and beam section. With this, the energy concentration per unit of surface in the object is much greater if compared with systems using diverging light sources. Systems using diverging light sources illuminate larger areas for simultaneously measuring a set of points instead of only one.

To take measurements of three-dimensional image by means of TOF, LIDAR or LADAR techniques, it is necessary to measure a set of points forming a three-dimensional image (or point cloud) and to that end, it is necessary to illuminate the surface corresponding to the image to be measured. The technologies which allow measuring a set of points in a controlled manner for forming three-dimensional images are basically divided into two:

Sequential scanning systems.
Systems based on arrays of detectors.

The sequential scanning systems form the 3D image by sequentially measuring unique points. The illumination sequence is usually implemented by means of optical systems such as galvanometric mirrors, MEMS, acoustic optical deflectors, etc. . . . . . Given a specific optical power, the sequential scanning systems concentrate said power at a small point measuring greater distances in comparison with beam-expanding systems. The collimation and the small size of the illuminated point mean that energy concentration per unit of surface is higher than in the case of diverging light sources. This high energy concentration per unit of surface means that the light reflected by the object is greater and as a result, the detector receiving the light from that point also receives a larger amount of light. Taking into account that one of the main factors that sets the limitation in the capability of measuring in distance in LIDAR systems is the capability of detecting low power reflected optical beams, the effect of energy concentration of the sequential scanning systems successfully maximizes the measurable distance as a result of harnessing all the optical power available for a single point of measurement. The greater the energy concentration per unit of surface, more energy flow is reflected on the point of measurement and accordingly, the easier the detection is. Although the sequential scanning systems allow obtaining a high spatial resolution in the three-dimensional image, performing point-to-point measurement means that the total measurement time is high in order to attain images having a high spatial resolution. This limits the amount of images which can be measured per second. By way of example, commercial equipment based on this technology such as Riegl laser scanners (http://www.riegl.com/), MDL laser scanners (http://www.mdl-laser.com) or Faro laser scanners (http://www.faro.com), can be mentioned.

In addition, there are systems based on arrays of detectors. These systems use a set of detectors arranged in grid in which each of them has the TOF measuring capability, based on pulsed TOF, TOF-FMCW or TOF-"Range Gated". In these systems, the points of the three-dimensional image are measured simultaneously through a set of detectors. In other words, said detectors measure in a synchronized manner a set of distance values equivalent to the number of detectors of the array and, at the same time, that set of measured points forms a three-dimensional image. The main advantage of these systems lies in the fact that several measurements are performed simultaneously which allows measuring a complete image through a single TOF measuring action. For example, in the case of pulsed TOF, a complete three-dimensional image can be measured through a single laser pulse (nevertheless, some equipment use more than one pulse to increase the quality of the image through successive measurement integration).

A condition necessary for performing simultaneous measurements through an array of detectors (partially or completely, i.e., using the entire array or only a part thereof) involves simultaneously illuminating all those points in the object which will be measured by the group of detectors. This means that the optical power is divided among all the points. Therefore, given an illumination source having a specific energy, the energy concentration per unit of surface will be distributed among all the points of measurement causing the energy reflected by each individual point to be inversely proportional to the number of measured points. By way of example, the "Flash LADAR" systems of the company Advanced Scientific Concepts (http://www.advancedscientificconcepts.com/), the pulsed TOF cameras of Odos Imaging (http://odos-imaqing.com/), as well as most TOF cameras based on TOF-FMCW (Time-of-Flight Frequency Modulated Continuous Waveform) measurement, for example, cameras from Mesa Imaging (www.mesa-imaging.ch), PMD (www.pmdtec.com) or SoftKinetic (http://www.softkinetic.com), can be mentioned.

The main advantage of this system with respect to the sequential scanning systems lies in the fact that the points are measured in parallel successfully measuring a large number of points for each TOF measuring action. In contrast, the sequential scanning systems perform a single measurement per TOF measuring action. Generally, it can be stated that considering an illumination source having determined power and shared between the two systems, the amount of three-dimensional images measured will be greater for the systems based on arrays of detectors than in the sequential measurement systems as a result of the effect of parallel measurements. Nevertheless, given that the illumination energy is finite and, in this comparative case, the same between the two systems, the measured distance will be greater in the sequential scanning system than in the of array of detectors given that the energy used for the point of measurement will be greater because all the power of the source is concentrated on one and the same point of measurement.

At an intermediate point, there are pieces of equipment which are made up of sets of detectors performing measurements simultaneously and sequential scanning at the same time. This technique is usually used for measuring larger surfaces. By way of example, the system of the company Velodyne Lidar (http://velodynelidar.com) can be highlighted. This system performs simultaneous measurements through a set of detectors while at the same time a rotary mechanical head performs scanning circularly in a 360° angle to attain a circular field of view. It can be considered that such systems bring together the characteristics of the two general methods described above since they are capable of measuring a set of points simultaneously while at the same time performing sequential scanning to measure all the points forming the final three-dimensional image.

In most systems based on array of detectors, the spatial resolution of the three-dimensional image is fixed by the number of detectors of the array of detectors. Nevertheless, there is a system which allows obtaining a spatial resolution in the image greater than that of the array of detectors. Said TOF system is described in the international patent application WO2012123809A1, and allows increasing the spatial resolution of the three-dimensional image as a result of the inclusion and use of light switches arranged in grid or an array of light switches (such as a light spatial modulator based on micromirrors, such as the case of a DMD: Digital Micromirror Device), in a number greater than light detectors, sequentially redirecting towards the array of light detectors the different portions of light reflected on the surface to be scanned. The inventors refer to that technology as "Digital Scanning" and it is considered to be located in an intermediate level between systems based on array of detectors and sequential scanning as it implements the two methods. Nevertheless, said scanning is digitally controlled and moving parts are not involved in same.

One of the uses of the system described in international patent application WO2012123809A1 is the measurement of three-dimensional images by means of the TOF or time of flight technique. A light source illuminates the surface to be measured. The DMD receives said beam through an optical group and sequentially redirects the received beam towards a detector or an array of detectors having TOF measuring capability. Given that the DMD is optically conjugated with the object being measured, it is capable of receiving in a controlled manner the light from each point of measurement. Each light switch is conjugated with a point of the surface to be measured, therefore, each light switch is capable of directing said portion of the total beam to the detector system or of rejecting same. Given that the DMD or array of switches and the detector or array of detectors are optically conjugated, the DMD is capable of directing said portions of the beam, which at the same time correspond to the light reflected by the points of the object to be measured, to the set of detectors in a controlled manner. Through a sequential process, the DMD will receive and direct the light reflected on the object towards the detector or group of detectors such that, the DMD will simultaneously send as many portions of the beam as the number of detectors present in said array of TOF detectors. In other words, a number of simultaneous TOF measurements equivalent to the number of detectors will be performed. The sequential measurement process consists of directing in a controlled manner all the points of the surface which the DMD is optically configured to receive. The resulting three-dimensional image will have as many measured points as the number of light switches in the DMD. Considering that the DMD has a much larger number of light switches than the array of detectors, the resulting image will have a spatial resolution greater than the number of detectors. This characteristic means that through a small group of detectors, and in turn less complex technically and more cost-effective than one with a large amount of detectors, TOF images having a high spatial resolution and with added functionalities can be measured.

One of the characteristics of this system is that for each TOF measuring action it is necessary to illuminate the entire surface to be measured. The entire surface is understood as the entire set of points which will form the three-dimensional image resulting from performing the sequential measurement process. Like what occurs in the systems based on arrays of detectors described above, this system illuminates the entire surface to be scanned causing the optical power available to be distributed among all the points of the surface in each TOF measuring action and only a small group of points (equivalent to the number of detectors) will be measured. The larger the number of detectors in the array of detectors, the more illumination energy is harnessed given that the number of simultaneously measured points is greater and the number of rejected points is lower. This has an impact on the light energy received in each point of the surface and, accordingly, negatively affects the distance of detection given that the illumination energy is divided among all the points of the surface.

The TOF three-dimensional image measurement systems have several applications and markets in which these systems are of use. Only by way of example, an application of interest for which it would be of interest to use such systems belongs to the field of automotive industry, particularly systems for monitoring, detecting and recognizing objects in the environment of an automobile in order to obtain information about the space in which this automobile circulates for purposes of safety, navigation or artificial intelligence while driving.

For such application, there are various fundamental performance requirements that must be met by the system to assure the use thereof in said context. Some of them are specified below only by way of example:

Operation in an outdoor environment under conditions with a large amount of daylight and background illumination.

Measurable distance up to 100 meters.
Viewing angle: horizontal ±20°, vertical ±5°.
Real time image measurement (>10 Hz).

Considering a distance of 100 m with said viewing angles, the surface to be measured has about 750 m². A TOF system based on an array of detectors will have to completely illuminate such surface in each TOF measuring action. Taking into account the radiometric parameters involved in the illumination, reflection and detection process of said beam, also considering the amount of background light and the detector parameters, it can be concluded that the illumination energy necessary for being able to be detected in the array of detectors is potentially very high. A sequential scanning system would require less illumination energy but its performance in terms of measurement speed would also be limited, being able to have limitations in moving object measurement.

Additionally, the inverse-square law establishes that the light intensity on a surface receiving light from a point light source is inversely proportional to the square of the distance between the light source and the surface and proportional to the cosine between the light beam and the normal to the surface. This means that the illumination intensity on a determined area will decrease with distance according to a quadratic factor. When a surface which is illuminated with a light source is moved away from the light source, the illumination intensity of the surface decreases, the illumination intensity decreasing much faster than the surface is being moved away from the light source. For example, if the illumination on a surface is 40 lux at a distance of 0.5 m from the light source, the illumination decreases to 10 lux at a distance of 1 m. This phenomenon decisively influences the measurable distance in a TOF system. In systems based on arrays of detectors, this effect can be acceptable for short distances (10 to 15 m) where the illumination intensity per m² remains high, but when measurement of medium-long distances (more than 15 m) and large areas is required, this phenomenon becomes a problem, since the illumination sources have limited energy. According to the knowledge of the present inventors, this is a real limiting factor in terms of distance measured in systems based on arrays of detectors.

To that end, and based on a series of studies based on simulations of different radiometric models performed by the present inventors, it can be said that use of systems based on arrays of detectors for applications in the field of automotive industry, in which measurements of at least 100 meters are required, is clearly unviable, because it would involve using a laser source having enormous power, which are very expensive, have a high consumption and are incompatible with the safety rules for eyes. The aforementioned commercial TOF cameras work well for certain applications (indoor environments and for ranges of short distances) but have serious limitations in outdoor environments with daylight and for medium-long distances. It must be noted that most of them use LEDs as a light source the power of which is substantially less compared with the laser sources used in sequential scanning systems.

The foregoing can be extrapolated to many other fields of application different from the field of automotive industry, all of them under the mentioned influence of the inverse-square law, although each field of application will have its particular restrictions relating to operating environment, measurement distances, viewing angles, etc.

According to the knowledge of the present inventors, there is no TOF device today which meets the requirements herein described for being applied on a massive scale in the field of automotive industry, even meeting the price requirements.

For such application in the field of automotive industry, and for many other applications of interest, it would be of interest to provide a system combining the advantages of the two methods for generating 3D images in TOF, i.e., the advantages of sequential scanning and the advantages of the systems based on arrays of detectors. The objective thereof would be to perform measurements on objects located at a greater distance than that covered by the systems based on arrays of detectors, with a good spatial resolution, a measurement speed greater than the sequential scanning systems and, using light sources having less power.

Patent application US20120249999A1 discloses one of such combined systems, since it proposes combining a "Flash LADAR" system with a laser scanning system for the purpose of using lasers with less power if the complete field of view does not have to be measured. In this system, the "Flash LADAR" component measures the distance to the illuminated object by means of TOF and the scanning system selectively illuminates said object. The inventors describe a series of applications such as the detection and tracking of stationary and/or moving objects, navigation or collision avoidance systems always based on the "Flash LADAR" technology also patented by the same inventors.

By means of the system proposed by patent document US20120249999A1, a laser light beam is projected on a sub-area (object) to be detected contained within the field of view, with a determined divergence so that a simultaneous measurement of said entire sub-area, including a single pixel or a small group of pixels, takes place, i.e., using a divergence greater than that of sequential scanning systems and less than that of systems based on array of detectors.

To direct the laser towards the sub-area to be scanned, a mirror of a galvanometric system (for example, MEM type) is used, so it can be said that the system of US20120249999A1 is actually a combination of the two TOF systems described above.

It is indicated that in the system proposed in US20120249999A1, the illumination beam can be varied so that it illuminates the field of view of the Flash LADAR system entirely (all the pixels of the array of detectors) or only partially (one or more pixels of the array of detectors) depending on the application.

In the system of patent document US20120249999A1 detection is performed with an array of light detectors the total resolution of which is adapted to the total area of the surface or scene to be scanned, so when they illuminate the mentioned sub-area a lower spatial resolution is obtained, i.e., if they only illuminate 10% of the total area, only 10% of the pixels of the array of light detectors will be illuminated, i.e., will receive reflected light, so a spatial resolution of only 10% of the total resolution of the array will be obtained, which means that such system provides rather poor results in terms of spatial resolution. In other words, the detectors of the array which are optically conjugated with the pixels of the sub-areas which are not being illuminated cannot be used for TOF measurement, causing this underuse of the set of detectors of the array to negatively affect the spatial resolution of the TOF image in comparison with the case of using a light source completely illuminating the field of view of the array of detectors in which all the detectors are used.

BRIEF DESCRIPTION OF THE INVENTION

It seems to be necessary to offer an alternative to the state of the art which overcomes the drawbacks found therein, and which particularly provides a solution to the problems of the system proposed in patent document US20120249999A1 in terms of spatial resolution.

To that end, the present invention relates, in a first aspect, to a system for scanning a surface, comprising:

illumination means configured and arranged for projecting on a surface to be scanned at least one light beam with a determined divergence for illuminating a sub-area of the area forming said surface to be scanned, which is at least partially reflective;

light direction means associated with said illumination means configured for directing said light beam so that it illuminates different sub-areas of the surface to be scanned in an alternating manner; and reception and detection means configured and arranged for receiving and detecting, in an alternating manner, corresponding portions of light of said light beam reflected on each of said different sub-areas of the surface to be scanned, where said reception and detection means comprise one or more light detectors.

Unlike the known proposals, the system proposed by the first aspect of the invention is characterized in that:

the reception and detection means comprise light redirection means including a plurality of light redirection elements arranged according to a determined spatial distribution model, in a number greater than the number of said at least one light detector, and configured for receiving the portions of reflected light, each of them in at least one part of a respective sub-model of said model;

and in that the light redirection means are configured and arranged for sequentially redirecting each of the portions of reflected light received in at least said part of each of said sub-models or in the entirety thereof towards said at least one light detector.

According to one embodiment, the light redirection means are configured and arranged for receiving each of the portions of reflected light in the entirety of said respective sub-model of said determined spatial distribution model, and for sequentially redirecting each of the portions of reflected light received in each of said sub-models towards said at least one light detector.

For one embodiment, said determined spatial distribution model forms an array, and each of said sub-models forms a sub-array.

According to a variant of said embodiment, said array is a grid and said sub-array is a sub-grid or a linear array.

According to a preferred embodiment, the system comprises a plurality of light detectors, including said light detector, arranged in grid or according to another type of spatial distribution model, the light redirection means being configured and arranged for sequentially redirecting each of the portions of reflected light received in each of the sub-models of the light redirection elements towards the light detectors arranged in grid or according to another type of spatial distribution model.

Although most part of the present description refers particularly to the grid arrangement of the light detectors, for other embodiments, the plurality of light detectors are discrete detectors which are not arranged in grid, i.e., they do not form a uniform grid. The following description (in this section and subsequent sections) with respect to the grid of light detectors is also valid for these embodiments in which they do not form a uniform grid.

According to one embodiment, the light redirection means further comprise at least one reflective element arranged between the determined spatial distribution model of the light redirection elements and the light detector or the grid or another type of light detector spatial distribution model, which is movable to collaborate with the light redirection elements for carrying out said sequential redirection of each of the portions of reflected light received in each of the sub-models towards the light detector or light detectors arranged in grid or according to another type of spatial distribution model, by means of performing respective sequential optical conjugations of the portions of reflected light received in each of the sub-models with the light detector or light detectors arranged in grid or according to another type of spatial distribution model.

According to an alternative embodiment, the light redirection means comprise at least one reflective element (static or that does not need to move) and an optical system arranged between the determined spatial distribution model of the light redirection elements and the light detector or the grid or another type of light detector spatial distribution model, where said optical system is configured and arranged for, the reflective element remaining static, optically conjugating at all times the light detector or the grid or another type of light detector spatial distribution model with the entire determined spatial distribution model of the light redirection elements.

Alternatively to the embodiment described in the preceding paragraph, i.e., the one referring to the inclusion of a static reflective element or a reflective element that does not need to move, according to another embodiment, the light redirection means does not comprise any reflective element, including instead an optical element, such as a lens, or without including any replacement element.

For one embodiment, the system of the first aspect of the invention comprises control means of the light redirection elements controlling same for sequentially activating the light redirection elements of each sub-model, for carrying out the sequential redirection of each of the portions of reflected light received in each of the sub-models towards the light detector or light detectors arranged in grid or according to another type of spatial distribution model.

For a preferred embodiment, the light direction means are configured for sequentially directing the light beam.

For the purpose of carrying out the mentioned alternating direction of the light beam, the light direction means comprise, according to one embodiment, at least one reflective and/or deflective device arranged between the light beam and the surface to be scanned, and which is movable for carrying out said alternating direction of the light beam and/or has elements capable of carrying out the alternating direction of the light beam without the reflective and/or deflective device being moved. For this last case, according to several embodiments, the reflective and/or deflective device is an electro-optical modulator or an acoustic optical modulator which, as is known, include such elements capable of carrying out the alternating direction of the light beam without the entire device having to be moved (so the device can be or remain stationary).

For one embodiment, the number of light redirection elements of each of the sub-models is equal to the number of light detectors.

In contrast, for another embodiment, in this preferred case as it allows further increasing the spatial resolution of the three-dimensional image, the number of light redirection elements of each of the sub-models is greater than the number of light detectors, and the system comprises control means associated with the light redirection means for carrying out the redirection of each of the portions of reflected light received in each of the sub-models towards the light detectors, sequentially redirecting sub-portions of each portion of reflected light towards the light detector or detectors, by means of the independent control of corresponding sub-groups of light redirection elements of each sub-model.

For a more basic embodiment, the reception and detection means comprise only one light detector, so each sub-model of the light redirection elements includes, for a first variant, only one light redirection element redirecting the portion of reflected light received towards the only light detector, and, for another more preferred variant, each sub-model includes several light redirection elements, each of which sequentially redirects a corresponding sub-portion of the portion of reflected light received in the sub-model towards the only light detector.

According to one embodiment, the system proposed by the first aspect of the invention comprises control means associated with the light direction means and a the light redirection means for carrying out both the direction of the light beam towards the different sub-areas of the surface to be scanned and the redirection of each of the portions of reflected light towards the light detector or detectors, in a synchronized manner.

According to one embodiment, each light redirection element is formed by a variable number of light redirection microelements.

For one embodiment, the determined spatial distribution model of the light redirection elements is a model of light switches, and for other embodiments the determined spatial distribution model of the light redirection elements comprises a light spatial modulator based on micromirrors, a liquid crystal display or deformable mirrors.

For a preferred embodiment, the system of the first aspect of the invention is particularly applicable to performing TOF measurements, therefore it comprises, in association with or as part of the reception and detection means, measurement means for measuring the distance between the system and each point of the surface to be scanned by means of determining the time of flight, an intermediate or hybrid system between sequential scanning systems and systems based on arrays of detectors making use of the advantages as regards beam concentration of the first systems and taking parallel measurements of the second systems, thus being obtained. The spatial uniformity of the points of the measured TOF image is assured by the model of the light redirection elements or model of light switches which, in a preferred embodiment, is a DMD from Texas Instruments or another type of light spatial modulator based on micromirrors.

For other embodiments, the system of the first aspect of the invention is applied for performing another type of measurements, such as measurements of light intensity, color or photon count.

The mentioned measurement means are configured for obtaining a three-dimensional topographic image (point cloud) of the surface to be scanned, according to one embodiment.

At least the light redirection elements and/or the mentioned reflective element and/or the reflective and/or deflective device are implemented, according to one embodiment, by means of microelectromechanical systems (MEMs).

According to one embodiment, the system proposed by the first aspect of the invention constitutes or forms part of a three-dimensional space measurement system which, for a preferred variant is applied in the field of automotive industry for the detection and tracking of objects and obstacles, such as other vehicles or pedestrians and, advantageously, for automatic or supervised vehicle navigation.

Other applications of interest of the system proposed by the first aspect of the invention are those included in the following non-exhaustive list:
Intelligent video surveillance.
Border area control.
Three-dimensional vision in security systems.
Self-guided vehicles.
3D multimedia video.
Object detection and tracking.
Safety driving assist.
Intelligent transportation systems.
Under foliage detection.
Mapping.
Artificial vision in robotics.

A second aspect of the invention relates to a method for scanning a surface, comprising:
projecting on an at least partially reflective surface to be scanned at least one light beam with a determined divergence for illuminating a sub-area of the area forming said surface to be scanned, directing it so that it illuminates different sub-areas of the surface to be scanned in an alternating manner; and
receiving and detecting in at least one light detector, in an alternating manner, corresponding portions of light of said light beam reflected on each of said different sub-areas of the surface to be scanned.

Unlike the methods known in the state of the art, the method proposed by the second aspect of the invention is characterized in that it comprises, before said reception and detection:
receiving each of the portions of reflected light in at least one part of a respective sub-model of a determined spatial distribution model in which a plurality of light redirection elements are arranged in a number greater than the number of said at least one light detector; and
sequentially redirecting each of the portions of reflected light received in at least said part of each of said sub-models towards said at least one light detector.

For one embodiment, the method comprises receiving each of the portions of reflected light in the entirety of said respective sub-model of said determined spatial distribution model, and sequentially redirecting each of the portions of reflected light received in each of said sub-models towards said at least one light detector.

For one embodiment, said determined spatial distribution model forms an array, and each of said sub-models forms a sub-array.

According to a variant of said embodiment, said array is a grid and said sub-array is a sub-grid, and according to another variant, the array is a grid and the sub-array is a linear array.

According to one embodiment, the method proposed by the second aspect of the invention comprises sequentially redirecting each of the portions of reflected light received in each of the sub-models of the light redirection elements towards a plurality of light detectors, including said light detector, arranged in grid or according to another spatial distribution model.

According to a preferred embodiment, the method proposed by the second aspect of the invention comprises carrying out the scanning of the surface to be scanned using the system of the first aspect of the invention.

According to another embodiment, the method of the second aspect of the invention comprises determining and varying the degree of divergence of the light beam and/or varying the number of light redirection elements of each sub-model, in an automatic manner and/or under a user's indication and/or according to a series of local input signals and/or remote input signals and/or input signals coming from internal and/or external detectors, to increase the distance of emission, for the purpose of detecting a surface from a greater distance, and/or the scanning speed, sacrificing spatial resolution, or to increase the spatial resolution, sacrificing received optical power, for the purpose of scanning an object of interest with greater precision.

According to one embodiment, the method comprises carrying out the variation of the degree of divergence of the light beam and/or of the number of light redirection elements of each sub-model, on the go, according to the circumstances of the operation and/or environment and/or object detections performed.

According to one embodiment, the method of the second aspect of the invention comprises varying the number of light redirection elements of the sub-model or sub-models of the light redirection elements where the light reflected on a detected object has been received.

At the same time, the method proposed by the second aspect of the invention comprises, for one embodiment, using still and/or moving object detection and tracking algorithms for controlling the scanning sequence and determining the sub-areas to be scanned as areas occupied or to be occupied by one or more objects of interest, implementing redirection sequences for redirecting portions of the reflected beam according to said algorithms for implementing still and/or moving object detection and tracking functions.

For such purpose, the method comprises, according to a variant of said embodiment, implementing movement prediction algorithms (e.g.: trajectory detection and prediction, etc. . . . ), as well as using images captured by a 2D camera for conditioning the running of the object detection and tracking algorithms.

A third aspect of the invention relates to a computer program including program instructions that can be run in a computer for implementing at least part of the steps of the method of the second aspect, including the analysis of light detector output signals, and variation, by means of generating corresponding control signals, of the degree of divergence of the light beam and of the number of active light redirection elements of each sub-model.

BRIEF DESCRIPTION OF THE DRAWINGS

The foregoing and other advantages and features will be better understood based on the detailed following description of several embodiments in reference to the attached drawings which must be interpreted in an illustrative and non-limiting manner, in which.

DETAILED DESCRIPTION OF SEVERAL EMBODIMENTS

Figure 1:
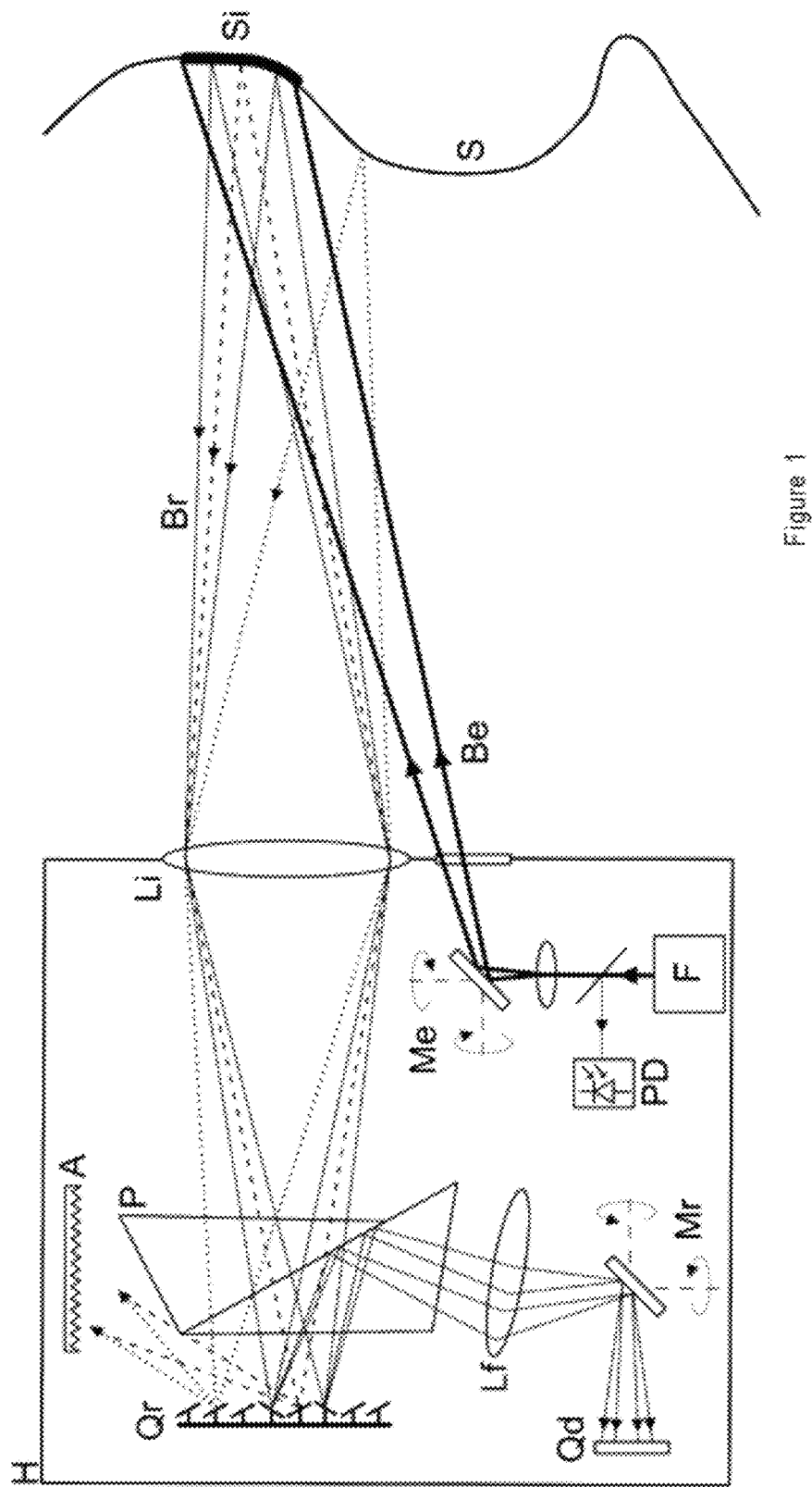
FIG. 1 schematically illustrates a part of the system proposed by the first aspect of the invention, for one embodiment.

FIG. 1 illustrates part of the system proposed by the first aspect of the invention for one embodiment for which it comprises, arranged in a casing H:

illumination means including a light source F, generally laser, and a series of optical elements arranged at the outlet of the light source F (beam splitter and lenses), as well as a photodetector PD for detecting the pulse emitted by the light source F and generating a corresponding detection signal to be used as the start of time counting for a pulsed TOF system. The illumination means are configured and arranged for projecting on the surface to be scanned S a light beam Be with a determined divergence for illuminating a sub-area Si of the area forming the surface to be scanned S;

light direction means associated with the illumination means configured for directing the light beam Be so that it illuminates different sub-areas Si of the surface to be scanned S in an alternating manner, and comprising a reflective and/or deflective device Me which is arranged between the light beam Be and the surface to be scanned S and which is movable rotating, for the illustrated embodiment, with respect to two axes (X and Y) for carrying out said alternating direction of the light beam Be; for another non-illustrated embodiment, the device Me is movable only with respect to one axis, for the purpose of obtaining only linear images;

reception and detection means configured and arranged for receiving and detecting, in an alternating manner, corresponding portions of light Br of said light beam Be reflected on each of the different sub-areas Si of the surface to be scanned S, where said reception and detection means comprise, for the illustrated embodiment:

an array or grid Qd of light detectors D; and
light redirection means including:
an array or grid Qr of light redirection elements GM (such as a DMD, where the GMs are groups of mirrors that are digitally controlled in the DMD), in a number greater than the number of light detectors D, for receiving the portions of reflected light Br (in this case through an optical system Li and a TIR-type (acronym of "Total Internal Reflection") prism P), each of them in a respective sub-grid SQr of the grid Qr (see FIGS. 2, 3 and 4), and
a reflective element Mr arranged between the grid Qr of the light redirection elements GM and the grid of light detectors Qd, which is movable rotating with respect to two axes for carrying out the sequential redirection of each of the portions of reflected light Br received in each of the sub-grids SQr towards the light detectors D of the grid Qd (in this case after being reflected on the prism P and going through an optical system Lf).

an element A capable of absorbing and rejecting light not directed by the grid of the redirection elements Qr towards the grid of light detectors Qd as established by a sequential scanning process.

Some of the elements of the system, such as the control means, different types of electric and electronic circuits, etc., have not been illustrated in FIG. 1 so that it is clearer and facilitates understanding the functions of illumination by sub-areas Si and the corresponding reception and detection carried out by same. For example, the TDC (acronym of "Time to Digital Converter") circuits used for the measuring TOF between the signal of the detector PD and D which will finally determine the distance measurement have not been depicted.

FIG. 1 illustrates, by means of two respective solid lines bearing an arrow, two portions Br of light reflected on the sub-area Si which are directed towards two corresponding light redirection elements GM of the grid Qr redirecting them towards the grid Qd of light detectors D, as well as, in dashed line, a portion of light reflected on the area of the surface Si, originating from the light beam Be, which will go to a light redirection element GM redirecting it towards a light absorber element A, so that it does not interfere with the signals of interest. A sequential process controls which GMs direct light towards the detectors and which ones direct light towards the absorber A. A portion of light reflected on another area of the surface S and not originating from the light beam Be, which will go to a light redirection element GM redirecting it towards the light absorber element A, also so that it does not interfere with the signals of interest, is also depicted in dotted line.

For a preferred embodiment, SiPM (acronym of "Silicon Photomultiplier") detectors are used as light detectors D due to their high gain (>$10^6$), high bandwidth and their capability for detecting the portions of reflected light Br in the form of pulses, by means of a photon count configuration or edge triggered configuration, which allows detecting extremely weak light pulses of the order of dozens of photons/pulse, far away from the capability of APD (acronym of "Avalanche Photodiodes") detectors or PIN photodiodes of standard TOF units.

Due to the fact that silicon-based detectors, such as SiPM detectors, can only detect visible light, for another embodiment the system comprises a type of detectors equivalent to SiPM detectors in technologies that are not based on silicon (for example, InGaAs/InP) which allow light detection in the infrared band, preferably at 1550 nm, for reasons of eye safety. Similarly, these detectors in the infrared band would have a sensitivity and gain of the same order as SiPM detectors, also allowing detection of amounts of light of the order of a few tens of photons.

The SiPM detectors are solid state detectors offering a gain and bandwidth comparable to that of PMT detectors. They are formed by an array of Geiger-mode polarized avalanche photodiodes on one and the same substrate and under one and the same polarization voltage. Each of the GM-APDs (acronym of "Geiger-Mode Avalanche Photodiode") is activated through the absorption of a small amount of photons obtaining at the output a current proportional to the number of activated GM-APDs, and accordingly, to the amount of received photons. Taking into account that the anodes of each of the GM-APDs forming the detector are attached, the total load at the outlet thereof will be proportional to the number of activated GM-APDs and will therefore be proportional to the amount of detected photons.

For other embodiments, another type of detectors such as photomultiplier tubes, APD (acronym of "Avalanche Photodiode"), PIN photodiodes, SPADs (acronym of "Single Photon Avalanche Diode"), etc., are used as light detectors, the type of light detector being selected according to the application.

Figure 2:
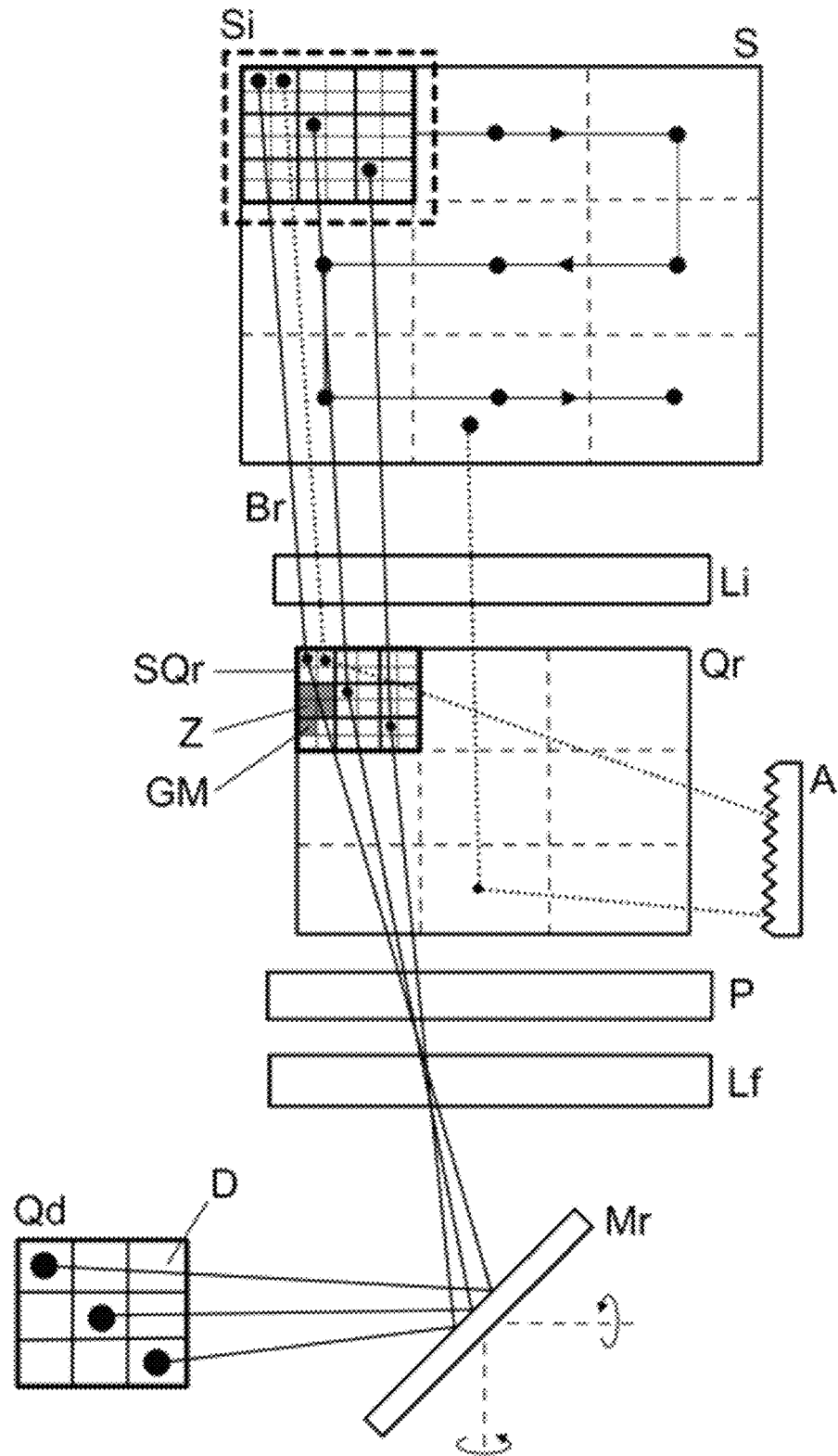
FIG. 2 shows a part of the elements of the system proposed by the first aspect of the invention in a situation of scanning a sub-area of the total surface to be scanned, for one embodiment.
Figure 3:
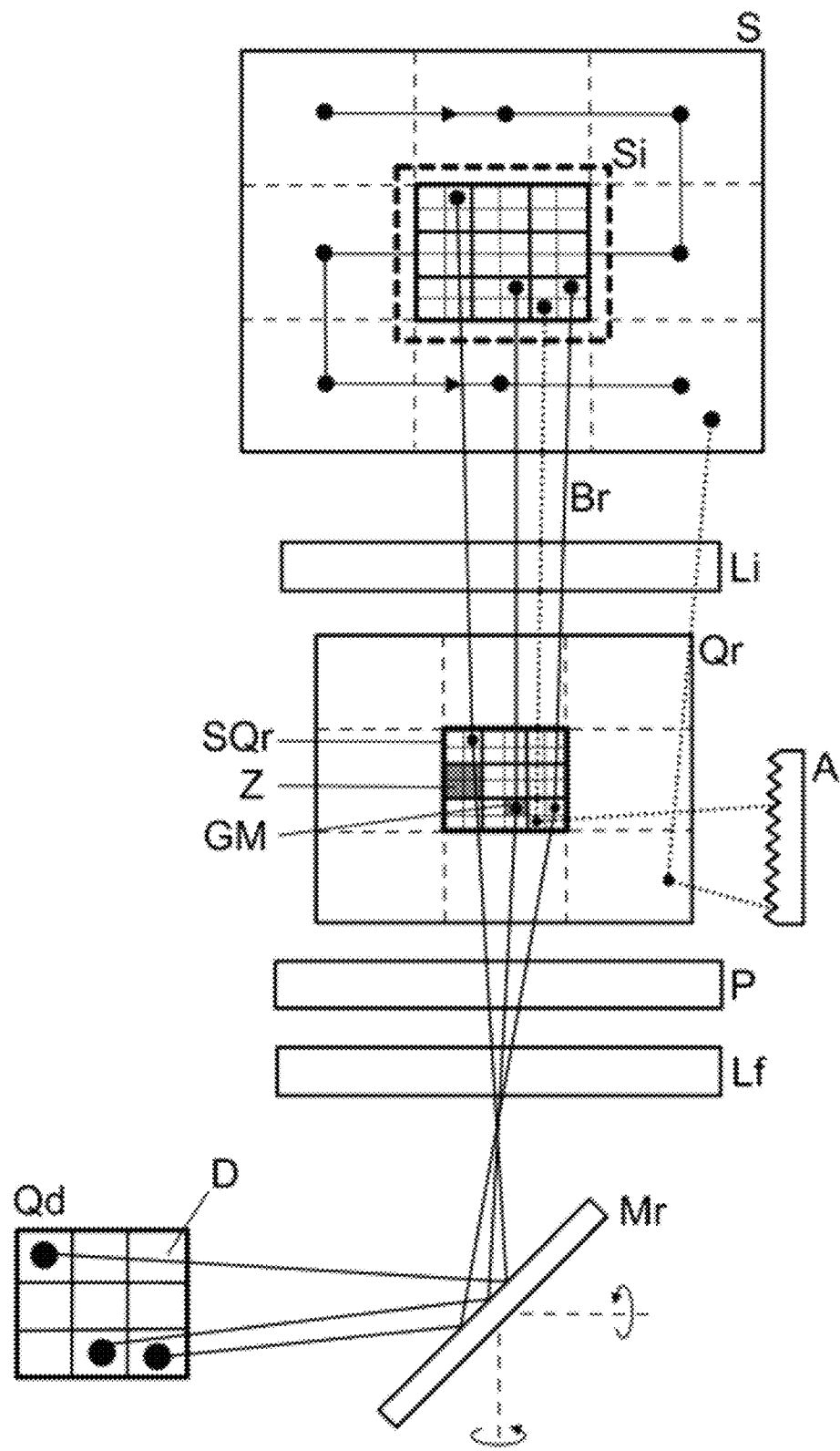
FIG. 3 shows the same elements illustrated in FIG. 2, but for a situation in which another sub-area of the total surface to be scanned is being scanned, for which the reflective element Mr has been moved to maintain the optical conjugation with the array of light detectors Qd.
Figure 4:
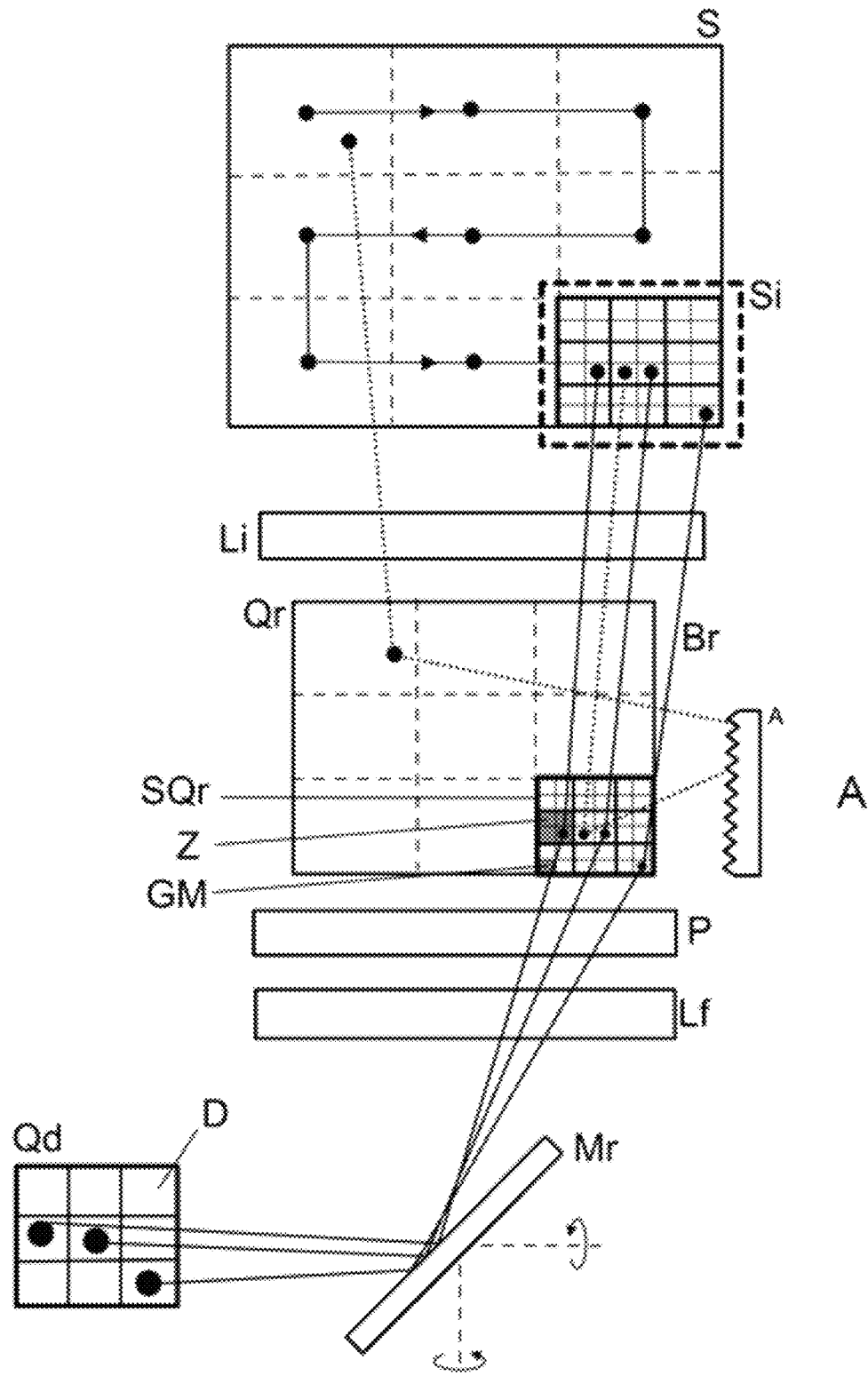
FIG. 4 is another view similar to that of FIGS. 2 and 3 for a situation in which another extra sub-area of the total surface to be scanned is being scanned.

FIGS. 2, 3 and 4 illustrate the scanning of three respective sub-areas Si of the surface S by means of the system and method proposed by the present invention for one embodiment which has been carried out by means of a sequential scanning of the surface S with the light beam Be, starting from the top left sub-area (FIG. 2) following a zigzag trajectory indicated by the lines bearing an arrow which go through all the sub-areas Si, one of the intermediate sub-areas of said trajectory being depicted in FIG. 3, and ending in the bottom right sub-area of the surface S (FIG. 4). The grid of light redirection elements Qr is optically conjugated with the entire surface to be scanned S.

Starting from FIG. 2, said figure shows how the three portions of light of Br, marked in solid line, reflected on the sub-area Si will go, after going through the optical system Li, to three respective light redirection elements GM of three respective regions Z of the sub-grid SQr which, in the event that Qr is a DMD, will be the active scanning region of the DMD. An example of a portion of light Br (broken line) reflected on the sub-area Si which will go to its respective element GM through the optical system Li and the latter redirects it to the light absorber element A for elimination can also be seen. Only one element GM of each region Z can redirect light of the beam Br towards a detector D (going through P, Lf and Mr) because there is only one detector D for each region Z.

Each of said three light redirection elements GM redirects the received portions of reflected light Br towards the reflective element Mr, after the passage thereof through the prism P and the optical system Lf, which adopts a position in which the grid of light detectors Qd is optically conjugated with the sub-grid SQr, and therefore with the sub-area Si, such that the three portions of reflected light Br are received, maintaining the spatial relation, in three corresponding light detectors D.

The scanning of the rest of sub-areas Si, those of FIGS. 3 and 4 and the remaining ones, is carried out in the same manner as explained in reference to FIG. 2, by means of moving the light beam Be for illuminating each sub-area Si, and correspondingly moving the reflective element Mr in a synchronized manner for optically conjugating the grid of light detectors Qd with the corresponding sub-grid of light redirection elements SQr, and for thereby receiving the portions of reflected light Br received by the respective sub-grid SQr by means of the suitable sequential scanning process.

According to one embodiment, devices having MEM mirrors, which are mirrors 2 or 3 mm in diameter with the capability of rotating about two axes perpendicular to one another, are used as device Me and reflective element Mr, which allows working at high frequencies (up to dozens of KHz) without suffering drawbacks like another type of conventional reflective elements (vibrations, large sizes or mechanical wear), which allows obtaining without any problem scanning speeds corresponding with the rate of images per second of the order of 30 images/s with images of more than 10K points per image.

The element Mr allows maintaining the spatial continuity between Qr and Qd which allows taking advantage of the total number of detectors for each region SQr.

Although FIGS. 2, 3 and 4 depict each region Z as being formed by one and the same number of light redirection elements GM, particularly four, according to the embodiment, each of these regions can include a different number of elements GM and/or each element GM can be formed by a different number of micromirrors (not illustrated). The number of GMs will vary according to the size and number of micromirrors that each one brings together, according to the configured size thereof (for improving energy reception, in return sacrificing spatial resolution, or vice versa). It must be taken into account that the size of each GM will be variable within the Z limits, i.e., that, at most, a GM will have a size equal to that of the entire surface of a region Z, causing only a single GM to fit therein.

In turn, said drawings depict an array of detectors Qd formed by 3×3 detectors. This size has been chosen by way of example for this embodiment. Nevertheless, each sub-grid SQr must contain divisions Z according to the number and form distribution of the grid of detectors Qd. In this case, a grid of detectors Qd with 3×3 detectors has generated a sub-division of the sub-grid SQr with 3×3 sub-regions Z.

In the embodiment illustrated in FIG. 2, two of the areas Z, particularly the central area and the area occupying the bottom right vertex of SQr, have received a portion of reflected light Br only in a single GM of each of them, both having been redirected completely once towards corresponding light detectors D of the grid Qd, one towards the central detector and the other towards the detector occupying the bottom right vertex of Qd.

In contrast, the area Z located in the top left vertex of SQr has received two sub-portions of reflected light Br in two respective GMs, one of which, marked with solid line, has been redirected towards a corresponding light detector D of the grid Qd, particularly the detector located in the top left vertex thereof, whereas the other, marked with broken line, has been diverted towards the absorber element A. In a subsequent moment (not illustrated), according to a sequential process, by means of actuation on the GMs, the sub-portion of reflected light Br, marked with broken line, is redirected towards the light detector D of the top left vertex of Qd, and the one marked with solid line is diverted towards the absorber element A, thereby increasing the spatial resolution, since one and the same light detector D (or pixel of the array of detectors Qd) receives the portion of light Br received in several GMs, in this case in the two GMs of the region Z of the top left vertex of Qr, in the form of a sequence of sub-portions.

Such increase in spatial resolution is representative of a preferred embodiment, and advantageously also applies to the rest of regions Z receiving reflected light Br, such that one and the same detector D receives the portion of light Br received in several GMs of each region Z, in the form of a sequence of sub-portions. The GMs which are not redirecting portions of light Br during the sequential process are diverted towards the absorber element A so that they do not interfere with the signals of interest.

This sequential redirection of sub-portions of the portion of reflected light is described in the international patent application WO2012123809A1, although applied simultaneously to the entire grid Qr, unlike the present invention in which work is carried out sub-grid by sub-grid SQr.

Obviously, for a less preferred embodiment, it is possible to use the system of the invention without performing such process of sequentially redirecting the sub-portions of reflected light Br.

By means of this preferred embodiment, a process referred to by the present inventors as SSDS (acronym of "Semi-Sequential Digital Scanning") process is obtained. Considering a light source having specific power and shared between the SSDS and a system based on array of detectors completely illuminating the surface being measured, and a field of view also shared between both systems, the SSDS system improves the maximum measurable distance as a result of its greater energy concentration per unit of surface. High performances in scanning speed, spatial resolution or other scanning properties are maintained. This improvement in measurement distance is due to the fact that the illumination beam does not have to cover the entire area to be scanned but rather allows scanning by sub-regions, the illumination energy being able to be concentrated on a smaller region in which the points to be measured are located. Use of the element Mr allows using the entire array of detectors Qd for each region SQr which prevents under-using detectors due to optical discontinuities between the points of the surface and the detection elements D.

Figure 5:
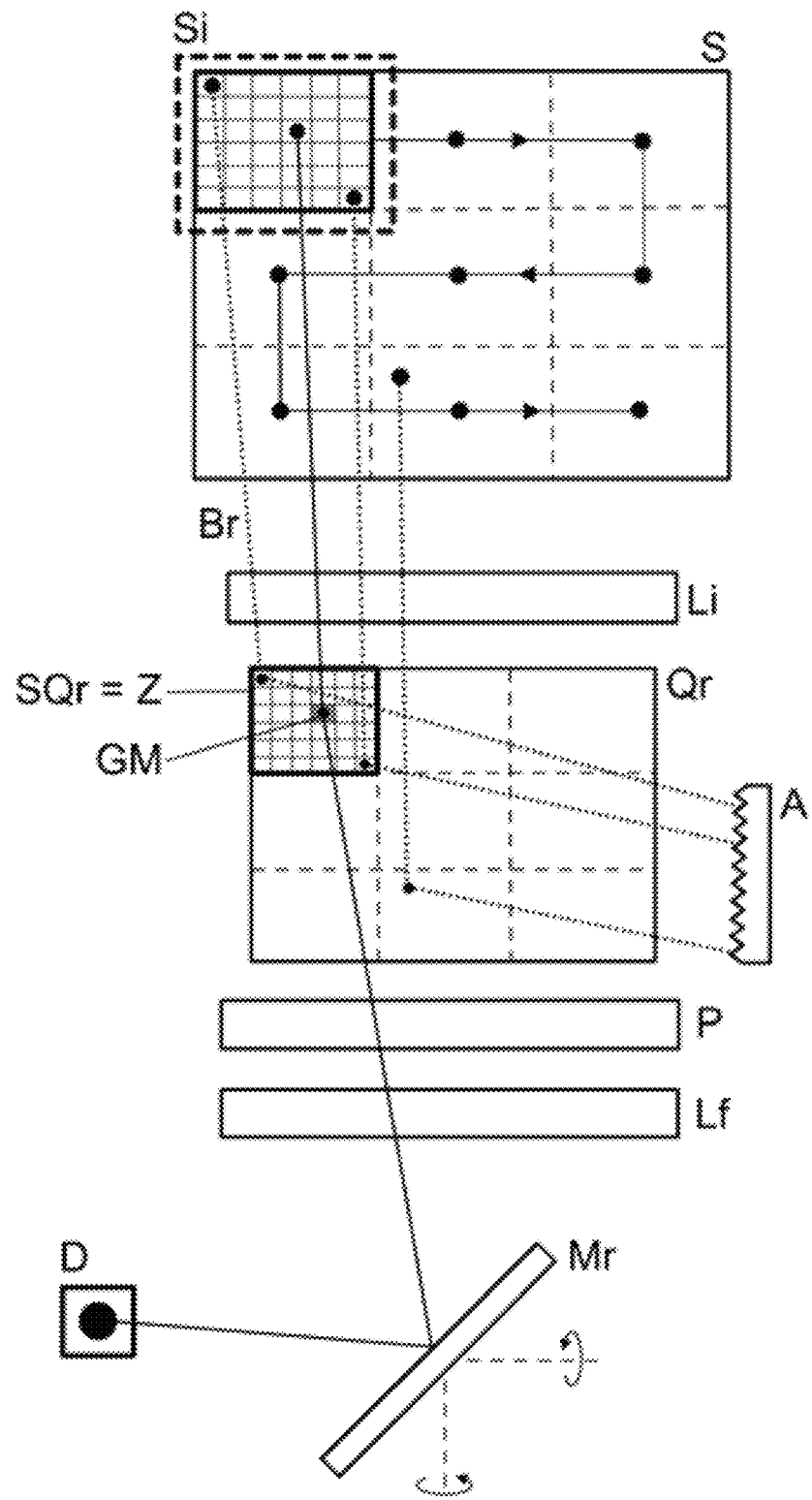
FIG. 5 is a view similar to FIG. 2, but for another embodiment for which the system comprises a single light detector.

FIG. 5 illustrates the basic embodiment described in a preceding section, in which the system includes only one light detector D, the size of the region Z would occupy the entire sub-grid SQr. Therefore, only one element GM can redirect sub-portions of light of the beam Br towards the detector D simultaneously. Particularly, according to said FIG. 5, the sub-portion marked with solid line is directed towards the only light detector D, whereas the two sub-portions marked with broken lines are diverted towards the absorber element A.

If said SSDS process is implemented for this basic embodiment of FIG. 5, each of the three sub-portions of reflected light Br will be sequentially redirected towards the only light detector D, whereas the other two will be diverted towards the absorber element A.

It can be said that the system proposed by the present invention allows obtaining intermediate results between sequential scanning systems and systems based on a standard array of detectors completely illuminating the surface, achieving a balanced combination of the properties making it ideal for a wide range of applications. The following table shows tentative values obtained by means of a prototype of the SSDS system for TOF measurements, comparing same with standard and completely tentative values of the mentioned systems. It must be pointed out that the values shown in the table, for the cases of sequential scanning and array of detectors, are highly variable depending on the properties of the light source, field of view, detector sensitivity, etc. Nevertheless, typical values that are close to a large amount of commercial systems based on these technologies are provided by way of example.

|  | Sequential scanning | Based on array of detectors | TOF SSDS |
| --- | --- | --- | --- |
| Measurable distance | >10 km Depending on laser power | <15 m standard >15 according to laser power and FOV | >100 m |
| Sensitivity to background light | Low | High | Medium |
| Scanning speed ("frame rate") | ~1 image/s | >60 images/s | ~30 images/s |

-continued

|  | Sequential scanning | Based on array of detectors | TOF SSDS |
| --- | --- | --- | --- |
| Spatial resolution | 100 Kpx | 20 Kpx | Variable up to 2 Mpx |
| Scanning properties that can be modified according to external conditions | No | No | Yes |
| Size | Large | Small | Small |

The amount of light detectors in an array Qd limits the image capturing speed. The larger the number of detectors, the higher the measurement speed since more simultaneous measurements can be carried out. In the system proposed by the first aspect of the invention, given that the spatial resolution is given by the array Qr of light redirection elements GM, it is possible to use arrays of light detectors Qd having a small size (e.g., 4×4 detectors). These arrays having a small size can incorporate more complex TOF measurement circuits than arrays having a large size (e.g., 128×128 detectors) used in the systems based on arrays of detectors since the integration thereof at the microelectronic level is much simpler. To that end, the time counting circuits (TDC circuit) can incorporate additional functions, such as those relating to measurements in complex environments, implemented in the form of circuits optimized for rain, fog, snow, dust and under foliage object detection, for example. Furthermore, the divergence of the emitted beam Be can be adjusted according to the required performance, and can even be adjusted using a type of motorized "zoom".

By means of the method and system proposed by the present invention, in addition to being able to modify the spatial resolution for measuring distances, intelligent object detection and tracking algorithms based on DMD and SSDS are included for controlling the scanning sequence such that they implement object detection and tracking functions. This means that the scanning sequence may not be repetitive but rather could focus only on the objects identified as "target" and could do without the rest of field of view. For some embodiments, movement prediction algorithms are implemented for performing intelligent detection and tracking, these algorithms being able to be run conditioned by the data captured by a 2D camera external to the apparatus, i.e., to casing H.

The advantage offered by the use of the DMD by the system and method proposed by the present invention, with respect to other systems, is that the latter is digitally controlled without mechanical movements, which favors running the complex object tracking and detection algorithms without mechanical movement limitations of the scanning system.

Another advantage offered by the system and method proposed by the present invention, in contrast with conventional systems, is that, for some embodiments, it allows varying the scanning parameters in real time, depending on external factors (or on any external or internal signal originating from detectors or from local or remote communication systems). This quality was referred to by the present inventors as "Dynamic Scanning", it is a natural consequence of the digital implementation of the scanning system of the first aspect of the invention and allows dealing with a wide range of functionalities having an added value, in addition to conventional distance measurements for 3D image, such as the following measurements relating to the field of automotive industry:

Adaptable distance measurement capabilities. As mentioned above, the smaller the spatial resolution of the image to be measured, the greater the distance which can be measured and also the greater the speed in images per second. This means that spatial resolution can be reduced when the external conditions require a long-range measurement. For example, in foggy conditions, it is preferable to increase the energy received by means of scanning with models including a smaller number of pixels (i.e., configuring larger GMs by bringing together a larger number of micromirrors), so the energy lost due to the effect of the fog can be compensated for by improvement in energy reception at the expense of spatial resolution loss.

Spatial resolution adaptable to the objects of interest. This is a step opposite that of the preceding point. Spatial resolution can be increased by bringing together a smaller amount of micromirrors in each GM, to detect with greater precision the objects of interest in order to distinguish, for example, pedestrians, artifacts or other objects in a more precise manner. By increasing spatial resolution, given one and the same illumination power, the measurable distance will be smaller because the energy redirected by each GM will also be less. Nevertheless, by increasing the spatial resolution of the image, more information of each object can be obtained or smaller objects can be detected. The increase in resolution can be concentrated on certain areas of the field of view identified as regions of interest. This process can be configured on the go.

Scanning depending on external conditions. Taking the application in the automotive industry as an example, driving along an expressway is rather different from driving along a city. In the first case, the objects of interest are at larger distances. In such case, by means of modifying the scanning configuration it is possible to detect the environment in a more suitable manner. In the second case, it is preferable to work with a high spatial resolution and a shorter distance. Furthermore, it may be useful to configure different spatial resolutions in some regions of the image. For example, the side regions can be configured with a high spatial resolution because pedestrians generally come from the sidewalks. On the other hand, upper areas with less interest can be rapidly scanned configuring them with a lower spatial resolution.

Combination of 2D information and data relating to distance. Sometimes 2D colored or black and white data can be useful for detecting risk situations, but it is not very reliable since the lack of depth information causes ambiguities in the analysis algorithms. A more precise tool can be obtained by means of combining 2D and 3D data to improve security and driving assistance. Digital scanning can complement 2D analysis, providing information relating to distance focusing only on the regions of interest.

The far infrared image (FIR: "Far Infrared Scanning") is useful for detecting pedestrians in low light conditions. However, without information relating to distance, image analysis can lead to false alarms and incorrect interpretations of the scene. A distance measurement can contribute in making conventional detection systems more reliable.

These are only some possible applications of the system and method proposed by the invention, but there is a wide range of applications which can benefit from the present invention, particularly when it incorporates the so-called dynamic scanning. Some of such applications have already been indicated in a preceding section (intelligent video surveillance, supervised semi-automatic or self-guided vehicles, etc.)

Figure 6:
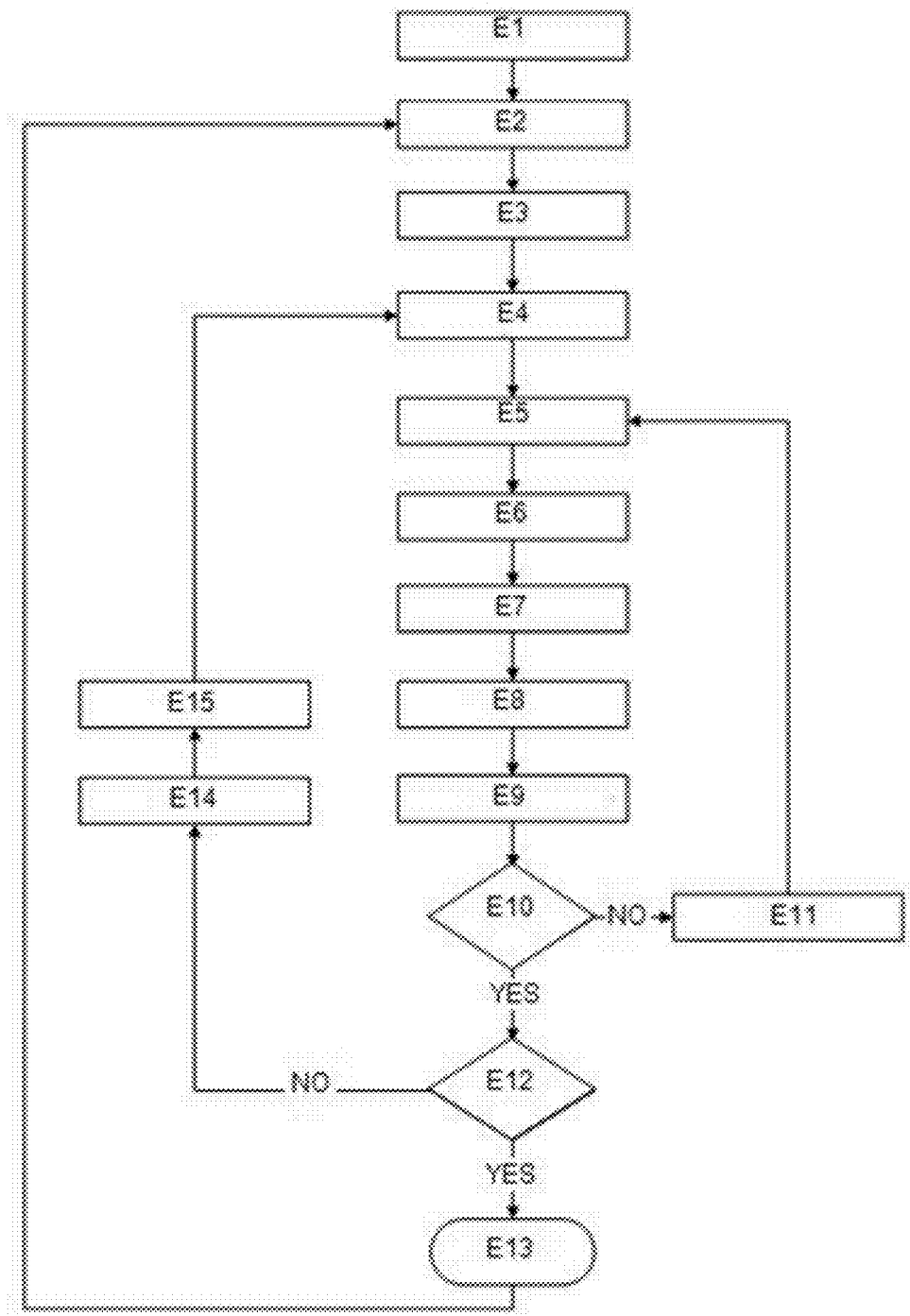
FIG. 6 is a flowchart depicting an implementation of the method proposed by the second aspect of the invention, for one embodiment.
Figure 7:
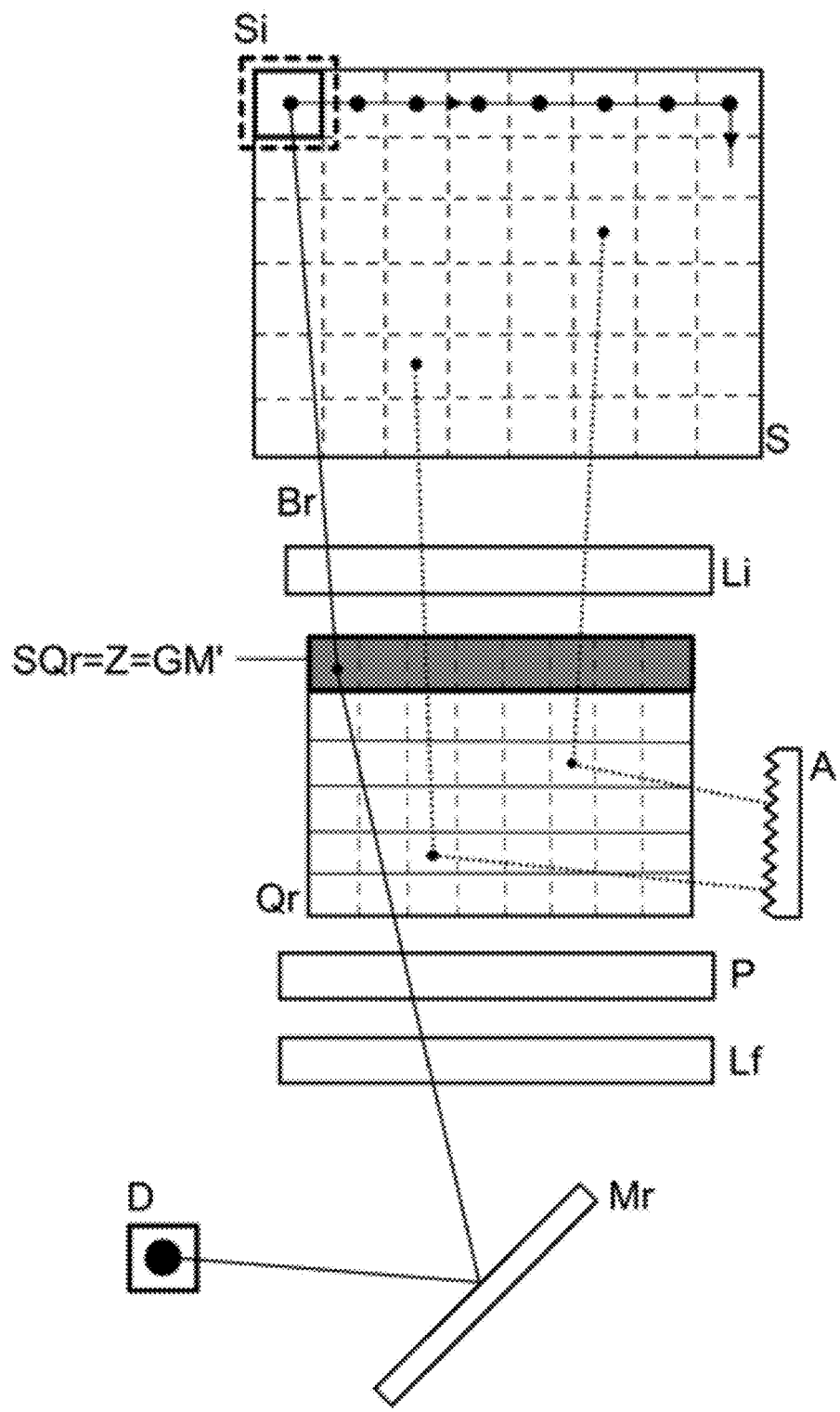
FIGS. 7 to 10 are similar to those of FIGS. 2 to 4, but for another embodiment for which each area SQr forms an array of simultaneously activated elements GM.

Finally, FIG. 6 illustrates a flowchart depicting an implementation of the method proposed by the second aspect of the invention, for one embodiment for which the latter includes the following steps:
- E1: Start.
- E2: Positioning the device or mirror Me in a first position.
- E3: Positioning the reflective element Mr in a first position
- E4: Generating a first scanning model of the DMD.
- E5: Emitting laser pulse.
- E6: Starting time counting with the TDC.
- E7: Detecting the pulse of reflected light Br in each detector D of the array Qd.
- E8: Stopping time counting with the TDC.
- E9: Obtaining distance value.
- E10: Has scanning of the sub-area Si end?
- E11: Going to the next scanning model of the DMD.
- E12: Has TOF scanning of the entire sub-area Si been obtained?
- E13: Transmitting data.
- E14: Positioning the reflective element Mr for optically conjugating same with the next sub-grid SQr of the DMD.
- E15: Positioning the device or mirror Me for directing the light beam Be towards the next sub-area Si.

As regards the scanning models of the DMD (or of another device used as Qr instead of a DMD), these generally refer to the selection of GMs directing light towards Qd, and the reason for changing said model in step E11 is generally to redirect another sub-portion of a portion Br, or sub-portions of portions Br, towards Qd in order to implement the embodiment explained above in which each portion Br would be sequentially redirected in sub-portions towards one and the same light detector, although the change of model can also have other reasons, such as that relating to the change of the size of each GM, on the go, in which case the change of model refers to the selection of micromirrors forming each GM.

Figure 8:
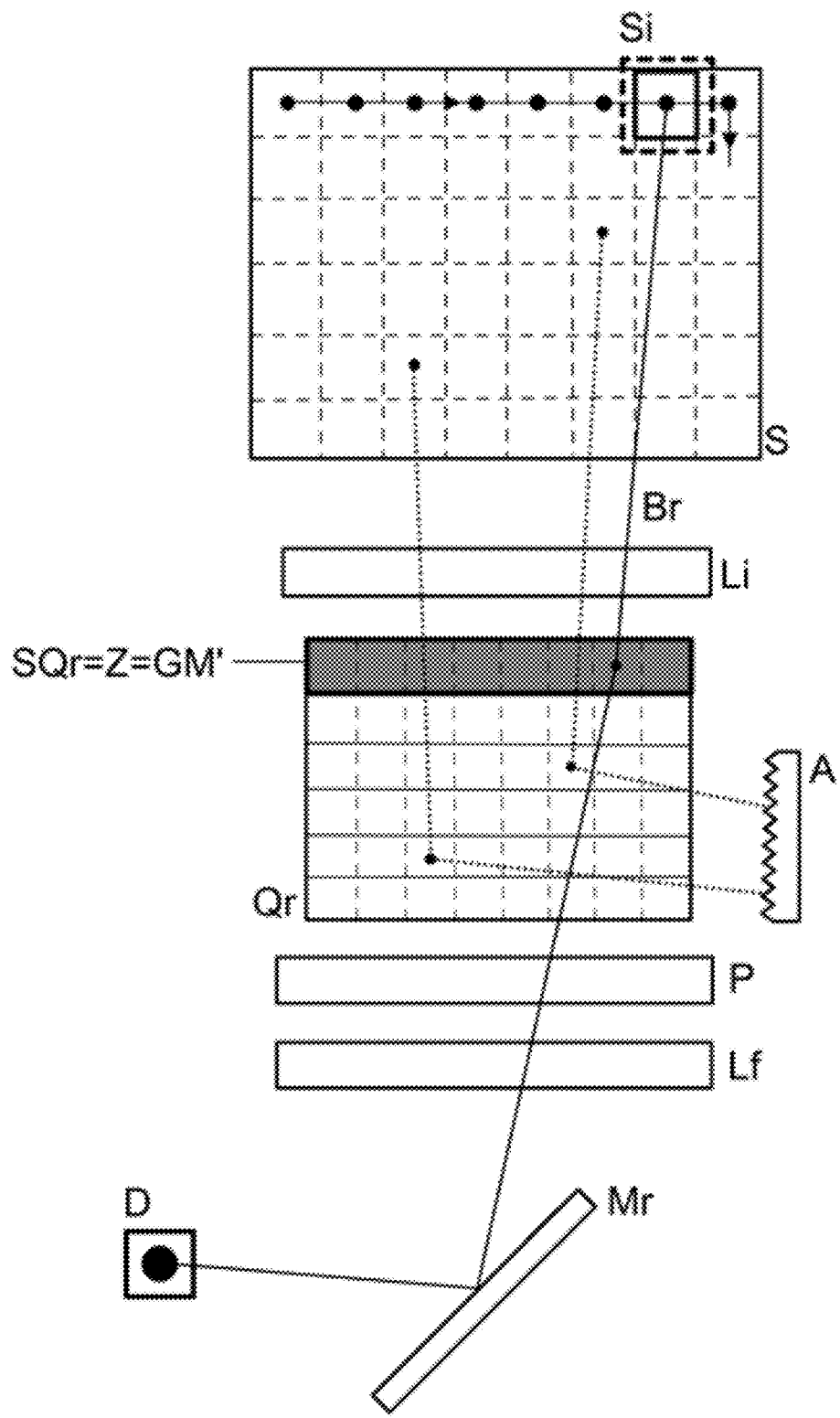
Figure 9:
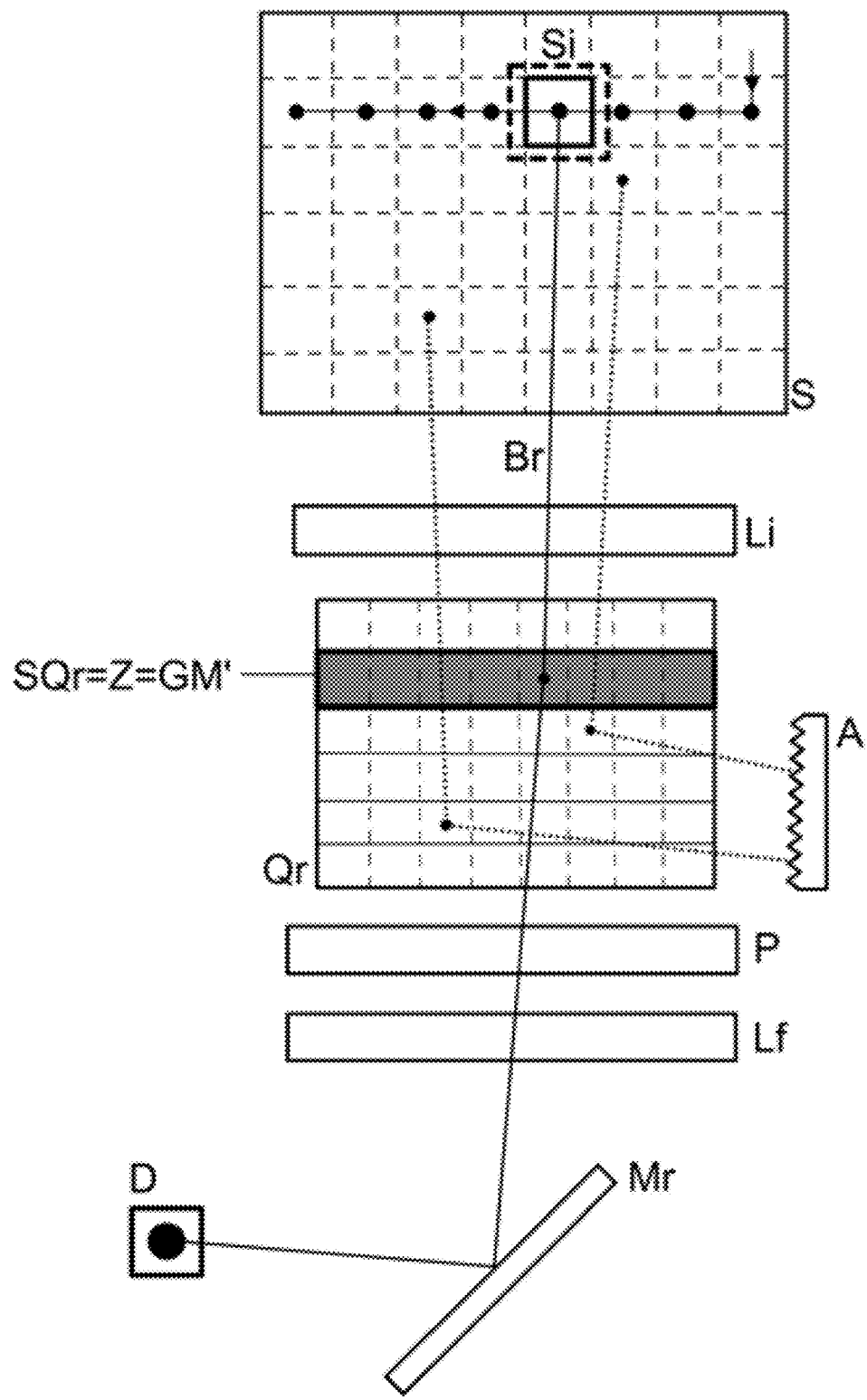
Figure 10:
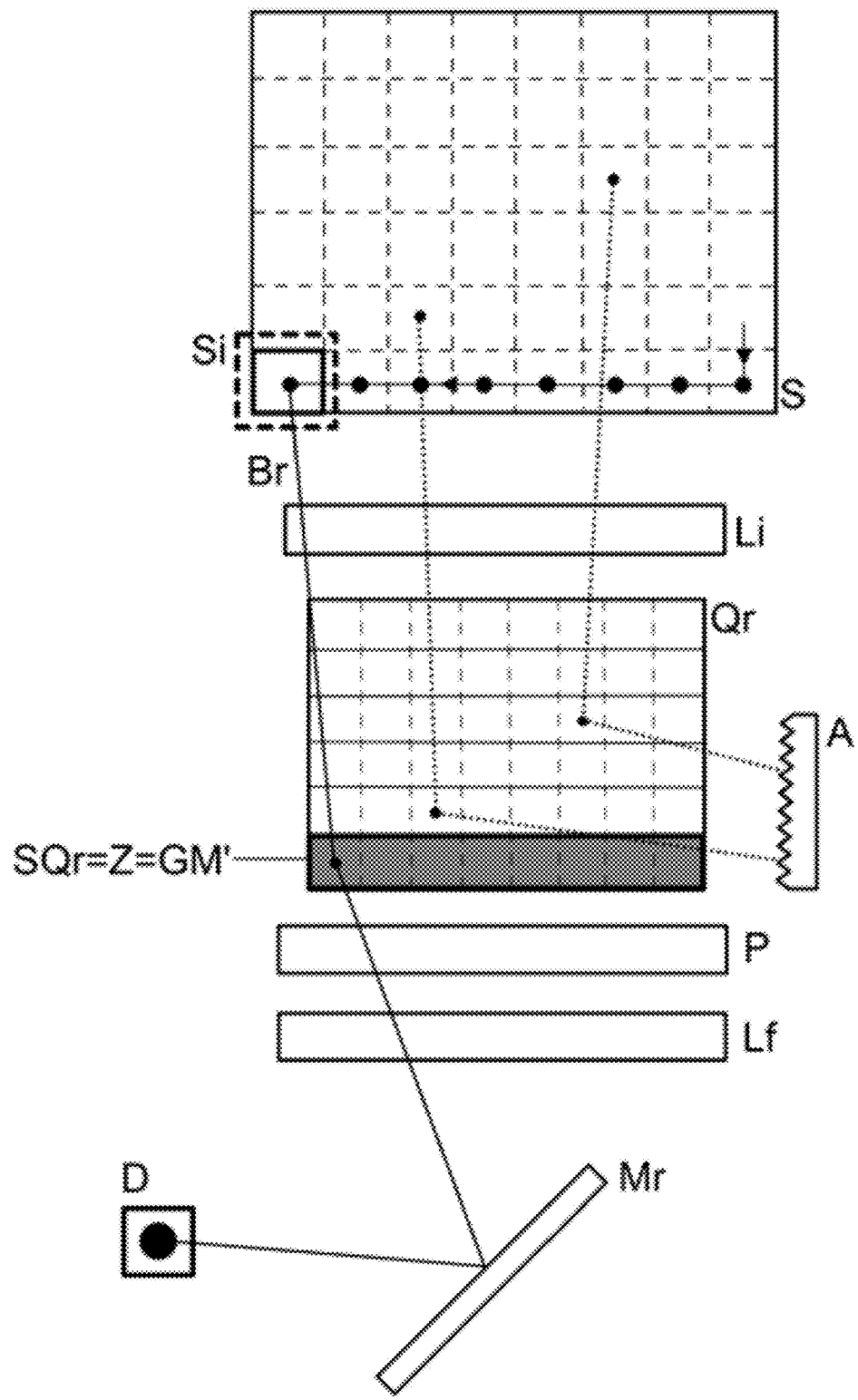

FIGS. 7 to 10 illustrate the scanning of three respective sub-areas Si of the surface S by means of the system and method proposed by the present invention for another embodiment which has been carried out by means of a sequential scanning of the surface S with the light beam Be, starting from the top left sub-area (FIG. 7) following the trajectory indicated by the lines bearing an arrow going through all the sub-areas Si, different intermediate sub-areas of said trajectory being depicted in FIGS. 8 and 9, and ending in the bottom left sub-area of the surface S (FIG. 10). The grid of light redirection elements Qr is optically conjugated with the entire surface to be scanned S.

Among other features, this embodiment differs from that of FIGS. 2 to 4 in that each sub-model SQr adopts the form of a linear array, formed by an area Z, each of them formed, in this case, by eight elements GM, all the elements GM of the linear array SQr being activated, which has been indicated with the reference GM', which is the sum of all activated GMs, i.e., eight. The linear arrays SQr are sequentially activated/deactivated as can be seen in FIGS. 7 to 10 for receiving portions of reflected light Br reflected at all times.

How the light which is reflected on other parts of the grid Qr outside the sub-grid SQr and which generally comes from the reflection of ambient light on the corresponding optically conjugated areas of the surface S, is redirected towards the absorber element A for the purpose of blocking same, can be seen. This aspect is also implemented in the embodiment of FIGS. 2 to 4, although for another alternative (and less preferred) embodiment, this aspect can be dispensed with. The main function of this functionality is to block light coming from the field of view, such that the detector D will only receive light coming from the points of the surface S which are optically conjugated with the region SQr=Z=GM'. The redirection elements located outside said region SQr=Z=GM' redirect the light to the element A so that it is rejected, preventing it from reaching the detector such that it does not interfere in the measurement process. According to the ratio between the surface of SQr=Z=GM' and the region within Qr redirecting light towards A, a lower or higher percentage of background light coming from the areas contained in S which are not being illuminated by the light source F will be blocked. The grid Qr is therefore used by way of a light blocking element by means of the activation and deactivation of different linear regions.

Different regions Si are sequentially illuminated by means of the light direction element Me. These illuminated regions Si generate a reflected beam Br which is redirected towards the detector D by means of the linear array region SQr=Z=GM'. As indicated above, the surface of the grid Qr which remains outside the region SQr=Z=GM' redirects the light towards the element A blocking and absorbing the light.

In this embodiment, the mirror Mr is kept static or inactive, because an optical system keeping the detector D (or array of detectors, for another non-illustrated embodiment) optically conjugated at all the times with the entire grid Qr, i.e., that is capable of focusing all the light coming from the grid Qr on the surface of the detector D (or detectors of an array of detectors, if this is the case), is used.

Although all the elements GM of the linear array SQr are kept activated, only the portion of reflected light Br corresponding to a region Si is received at all times, and it takes place in part of the linear array SQr (in this case in a single GM) so the light detector will receive such portion Br (together with the residual portion that is reflected on the rest of activated GMs, but the latter has an insignificant value).

Such activation of all the elements GM of the linear array SQr, according to this embodiment of FIGS. 8 to 10, is to allow use thereof with a very quick scanning system causing the beam laser Be to move very quickly between the different regions Si, which would mean that if the elements GM of the linear array SQr had to be sequentially activated, they would have to do same at a speed equal to or greater than that of the mentioned scanning, which is not common by means of using the elements available according to current technology.

The regions SQr=Z=GM' can have various forms, alternative to those illustrated, for example, horizontal, vertical, diagonal with different degree of inclination, they can even be formed by more than one region along the grid Qr.

The embodiment illustrated in FIGS. 2 to 4 could be modified based on the embodiment of FIGS. 7 to 10 in order to adapt same to a high scanning speed, for which each region SQr illustrated in said drawings would be extended to occupy an entire line of sub-grids.

Figure 11:
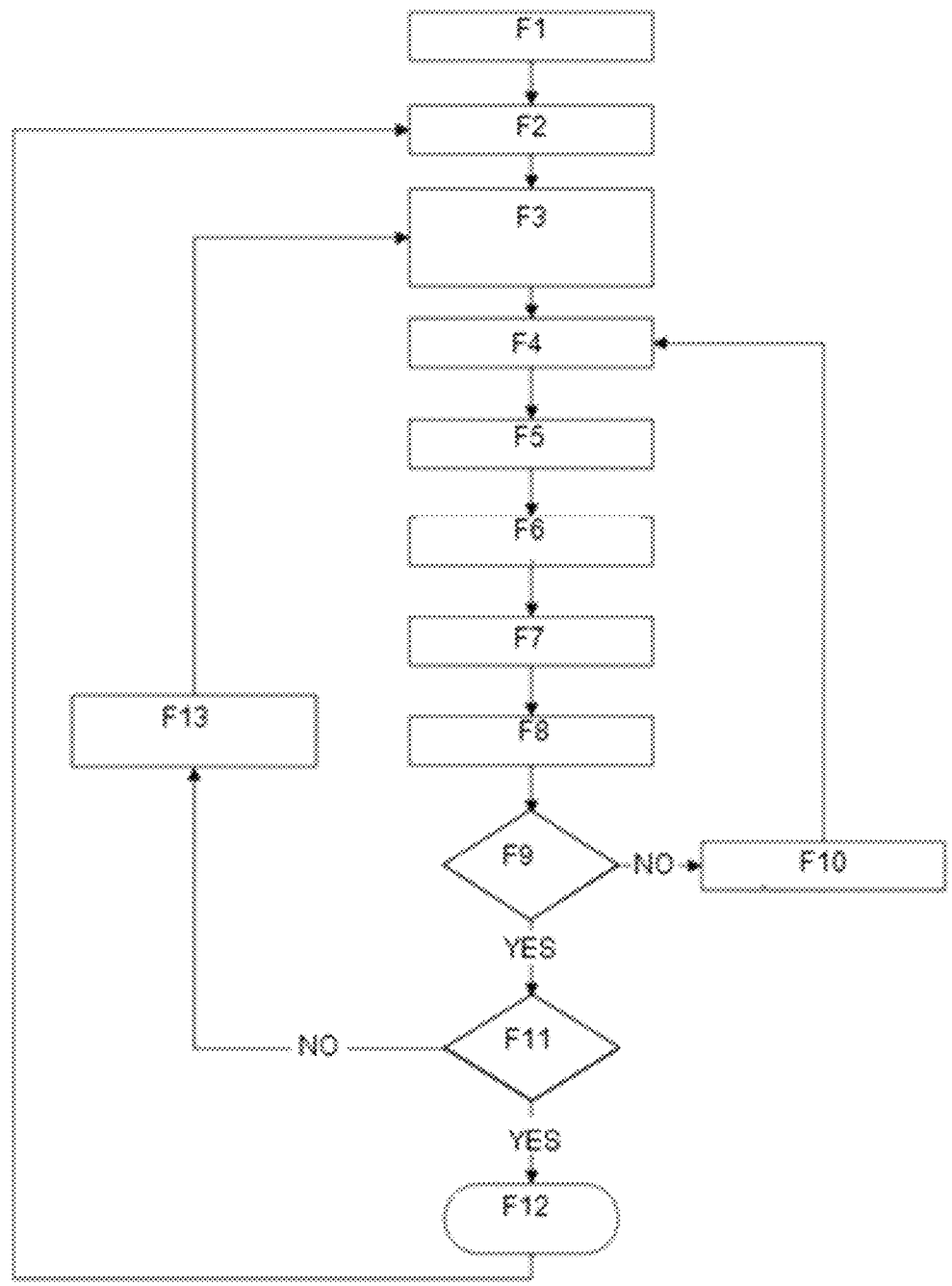
FIG. 11 is a flowchart depicting an implementation of the method proposed by the second aspect of the invention, for the implementation of FIGS. 7 to 10, keeping the reflective element Mr static.

FIG. 11 illustrates, by means of a flowchart, an implementation of the method proposed by the second aspect of the invention applied to the configuration of FIGS. 7 to 10, where the flowchart is applied to the use of a static Mr or an Mr that does not need to be moved, because the detector D is permanently optically conjugated with the DMD as a whole, i.e., Qr. The flowchart includes the following steps:

F1: Initialization.
F2: Configuring DMD with the first model SQr=Z=GM'.
F3: Positioning the device or mirror Me in a first position of the corresponding model SQr=Z=GM'.
F4: Emitting laser pulse.
F5: Starting time counting with the TDC.
F6: Detecting the pulse of reflected light Br in the detector D.
F7: Stopping time counting of the TDC.
F8: Obtaining distance value.
F9: SQr=Z=GM' ended (i.e., reception of Br in all the GMs of SQr)
F10: Positioning Me for directing the light beam Be towards the next sub-area Si.
F11: Has TOF scanning of the entire sub-area Si been obtained?
F12: Transmitting data.
F13: Configuring the DMD with the next scanning model of the DMD, i.e., deactivating the present area SQr and activating the next area (in this case the one immediately below).

Figure 12:
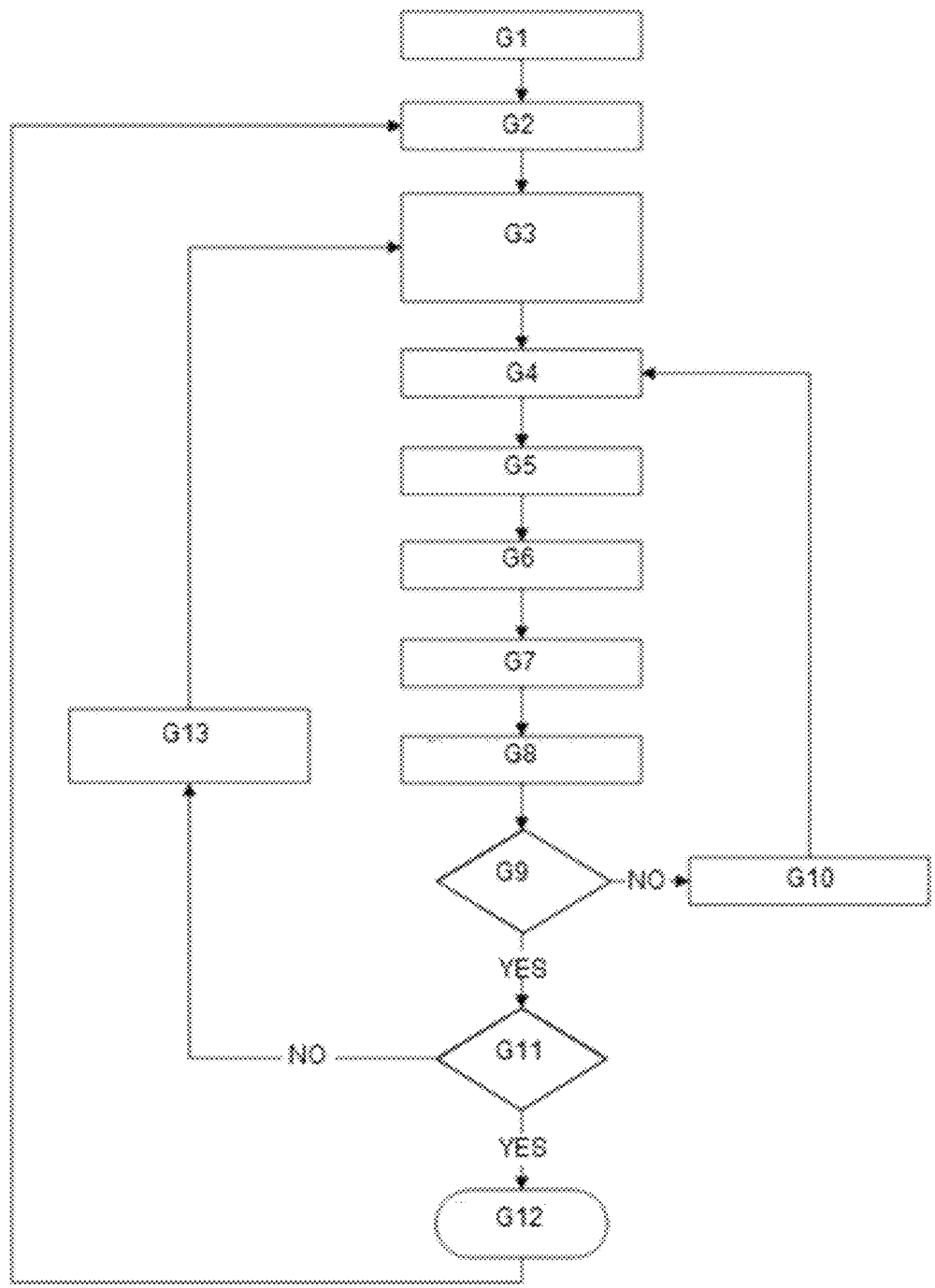
FIG. 12 is a flowchart similar to that of FIG. 11, referring to an implementation similar to that of FIGS. 7 to 10, but in which the reflective element Mr is moving and the flowchart includes the movement thereof.

With respect to the chart of FIG. 12, said figure illustrates, by means of a flowchart, an implementation of the method proposed by the second aspect of the invention, similar to that of FIG. 11 but applied to a configuration such as that of FIGS. 7 to 10 but with the movable reflective element Mr, the flowchart including the movement of Mr for optically conjugating the detector D with the suitable QM at all times in a sequential manner. The chart includes the following steps:

G1: Initialization.
G2: Configuring DMD with the first model SQr=Z=GM'.
G3: Positioning Me and Mr in a first position of the corresponding model SQr=Z=GM'.
G4: Emitting laser pulse.
G5: Starting time counting with the TDC.
G6: Detecting the pulse of reflected light Br in the detector D.
G7: Stopping time counting of the TDC.
G8: Obtaining distance value.
G9: SQr=Z=GM' ended (i.e., reception of Br in all the GMs of SQr).
G10: Positioning Me and Mr at the next position, the former (Me) for directing the light beam Be towards the next sub-area Si, and the latter (Mr) for optically conjugating the detector D with the next GM of SQr.
G11: Has TOF scanning of the entire sub-area Si been obtained?
G12: Transmitting data.
G13: Configuring the DMD with the next scanning model of the DMD, i.e., deactivating the present area SQr and activating the next area (in this case, the one immediately below).

The flowcharts of FIGS. 6, 11 and 12 are implemented, for some embodiments, by the computer program proposed by the fourth aspect of the invention.

A person skilled in the art would be able to introduce changes and modifications in the embodiments described without departing from the scope of the invention as defined in the attached claims.

The invention claimed is:

1. A system for scanning a surface, comprising:
a light source (F) configured to illuminate a surface to be scanned (S), which is at least partially reflective;
a reception and detection unit configured to receive and detect a portion (Br) of the light reflected by said surface (S),
said reception and detection unit comprising a light redirection unit including a plurality of light redirection elements (GM) arranged according to a determined spatial distribution model (Qr), in a number greater than the number of some light detectors including at least one light detector (D), and configured to receive portions of reflected light (Br), each of said portions in at least one part of a respective sub-model (SQr) of said determined spatial distribution model (Qr), and
said light redirection unit being configured and arranged to sequentially redirect each of the portions of reflected light (Br) received in at least said part of each of said sub-models (SQr) towards said at least one light detector (D),
wherein the system further comprises a light direction device (Me) associated with said light source (F) configured to direct at least one light beam (Be) with a determined divergence so that it illuminates different sub-areas of the surface to be scanned (S) in an alternating manner, and wherein said reception and detection unit is configured and arranged to receive and detect, in an alternating manner, corresponding portions of light (Br) of said light beam (Be) reflected on each of said different sub-areas (Si) of the surface to be scanned (S).

2. The system according to claim 1, wherein said light redirection unit is configured and arranged to receive each of the portions of reflected light (Br) in the entirety of said respective sub-model (SQr) of said determined spatial distribution model (Qr), and to sequentially redirect each of the portions of reflected light (Br) received in each of said sub-models (SQr) towards said at least one light detector (D).

3. The system according to claim 1, further comprising:
a plurality of light detectors (D), including said light detector, arranged in grid (Qd) or according to another type of spatial distribution model, the light redirection unit being configured and arranged to sequentially redirect each of the portions of reflected light (Br) received in each of the sub-models (SQr) of the light redirection elements (GM) towards the light detectors (D) arranged in grid (Qd) or according to another type of spatial distribution model.

4. The system according to claim 1, wherein said light redirection unit further comprises at least one reflective element (Mr) arranged between the determined spatial distribution model (Qr) of the light redirection elements (GM) and the light detector (D) or the grid or another type of light detector spatial distribution model (Qd), which is movable to collaborate in carrying out said sequential redirection of each of the portions of reflected light (Br) received in each of the sub-models (SQr) towards the light detector (D) or the light detectors (D) arranged in grid (Qd) or according to another type of spatial distribution model, by means of respective sequential optical conjugations of the portions of reflected light (Br) received in each of the sub-models (SQr) with the light detector (D) or the light detectors (D) arranged in grid (Qd) or according to another type of spatial distribution model.

5. The system according to claim 1, wherein said light redirection unit further comprises at least one reflective element (Mr) and an optical system arranged between the determined spatial distribution model (Qr) of the light redirection elements (GM) and the light detector (D) or the grid or another type of light detector spatial distribution model (Qd), where said optical system is configured and arranged for, the reflective element (Mr) remaining static, optically conjugating at all times the light detector (D) or the grid or another type of light detector spatial distribution model (Qd) with the entire determined spatial distribution model (Qr) of the light redirection elements (GM).

6. The system according to claim 1, wherein said light direction device (Me) is configured to sequentially direct the light beam (Be).

7. The system according to claim 1, wherein the light direction device (Me) comprises at least one reflective and/or deflective device arranged between the light beam (Be) and the surface to be scanned (S), and which is movable for carrying out said alternating direction of the light beam (Be) and/or has elements capable for carrying out the alternating direction of the light beam (Be) without the reflective and/or deflective device (Me) being moved.

8. The system according to claim 1, further comprising:
a control unit associated with the light direction device (Me) and with the light redirection unit for carrying out both the direction of the light beam (Be) towards the different sub-areas (Si) of the surface to be scanned (S) and the redirection of each of the portions of reflected light (Br) towards the light detector or detectors (D), in a synchronized manner.

9. The system according to claim 1, further comprising:
in association with or as part of the reception and detection unit, a measurement unit for measuring the distance between the system and each point of the surface to be scanned (S) by means of determining the time of flight.

10. The system according to claim 9, wherein said measurement unit is configured to obtain a three-dimensional topographic image by means of a cloud of points of the surface to be scanned (S).

11. The system according to claim 1, wherein the system constitutes at least part of a system selected from the group consisting of:
a collision prevention system,
a static or moving object detection and tracking system,
a intelligent video surveillance system,
a border area control system,
a three-dimensional vision system in smart security systems,
a navigation system for supervised semi-guided or self-guided vehicle,
a 3D multimedia video system,
a safety driving assist system,
an intelligent transportation system,
an under foliage detection system,
a mapping system, and
an artificial vision system in robotics.

12. The system according to claim 1, wherein at least one of said light redirection elements (GM), reflective element (Mr), and reflective and/or deflective device (Me) is implemented by means of microelectromechanical systems.

13. A method for scanning a surface, comprising:
illuminating a surface to be scanned (S) which is at least partially reflective;
receiving a portion of reflected light (Br) in at least one part of a respective sub-model (SQr) of a determined spatial distribution model (Qr) in which a plurality of light redirection elements (GM) are arranged in a number greater than a number of light detectors including at least one light detector (D); and
sequentially redirecting each portion of portions of reflected light (Br) received in at least said part of each of said sub-models (SQr) towards said at least one light detector (D) of said light detectors,
wherein said step of illuminating a surface comprises projecting on said reflective surface to be scanned (S) at least one light beam (Be) with a determined divergence for illuminating a sub-area (Si) of the area forming said surface to be scanned (S), directing said light beam (Be) so that it illuminates different sub-areas (Si) of the surface to be scanned (S) in an alternating manner; and
wherein the method further comprises receiving and detecting in said at least one light detector (D), in an alternating manner, corresponding portions of light (Br), of said light beam (Be) reflected on each of said different sub-areas (Si) of the surface to be scanned (S) and redirected from each one of said sub-models (SQr).

14. The method according to claim 13, further comprising:
receiving each of the portions of reflected light (Br) in the entirety of said respective sub-model (SQr) of said determined spatial distribution model (Qr), and sequentially redirecting each of the portions of reflected light (Br) received in each of said sub-models (SQr) towards said at least one light detector (D).

15. The method according to claim 13, further comprising:
determining and varying the degree of divergence of the light beam (Be) and/or varying the number of light redirection elements (GM) of each sub-model (SQr), in an automatic manner and/or under a user's indication and/or according to a series of local input signals and/or remote input signals and/or input signals coming from internal and/or external detectors, to increase the distance of emission, for the purpose of detecting a surface from a greater distance, and/or the scanning speed, sacrificing spatial resolution, or to increase the spatial resolution, sacrificing received optical power, for the purpose of scanning an object of interest with greater precision.

16. The method according to claim 15, further comprising:
carrying out said variation of the degree of divergence of the light beam (Be) and/or of the number of light redirection elements (GM) of each sub-model (SQr), on the go, according to the circumstances of the operation and/or environment and/or object detections performed.

17. The method according to claim 13, further comprising:
running object detection and tracking algorithms that control the scanning sequence and determine the sub-areas (Si) to be scanned (S) as areas occupied or to be occupied by one or more objects of interest.

18. The method according to claim 17, wherein said detection and tracking algorithms include movement prediction algorithms.

19. The method according to claim 18, further comprising:
conditioning, with images captured by a 2D camera, the running of said object detection and tracking algorithms.

20. A non-tangible computer program including program instructions that are run in a computer for implementing at least the steps of the method according to claim 13.

* * * * *